United States Patent
Ono et al.

(10) Patent No.: US 7,668,455 B2
(45) Date of Patent: Feb. 23, 2010

(54) IMAGE CAPTURING APPARATUS, IMAGE CAPTURING METHOD, REPRODUCING APPARATUS, REPRODUCING METHOD AND PROGRAM

(75) Inventors: Shuji Ono, Kanagawa (JP); Kazuhiro Mino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 450 days.

(21) Appl. No.: 11/303,923

(22) Filed: Dec. 19, 2005

(65) Prior Publication Data

US 2006/0159445 A1   Jul. 20, 2006

(30) Foreign Application Priority Data

| Dec. 20, 2004 | (JP) | ............................. 2004-368367 |
| Dec. 24, 2004 | (JP) | ............................. 2004-374691 |
| Nov. 25, 2005 | (JP) | ............................. 2005-341031 |
| Dec. 14, 2005 | (JP) | ............................. 2005-361060 |

(51) Int. Cl.
*G03B 17/24* (2006.01)
(52) U.S. Cl. .................................. 396/312; 348/231.4
(58) Field of Classification Search ................. 396/312, 396/310; 386/106; 348/220.1, 231.4
See application file for complete search history.

(56) References Cited

U.S. PATENT DOCUMENTS

| 5,625,463 A * | 4/1997 | Ha-Ngoc ..................... 386/106 |
| 6,611,652 B1 * | 8/2003 | Iwamoto et al. ............... 386/46 |

2003/0112864 A1 * 6/2003 Karczewicz et al. ... 375/240.01

FOREIGN PATENT DOCUMENTS

| JP | 7-154734 A | 6/1995 |
| JP | 2006179996 A * | 7/2006 |

* cited by examiner

*Primary Examiner*—Melissa J. Koval
*Assistant Examiner*—Autumn Parker
(74) *Attorney, Agent, or Firm*—Birch, Stewart, Kolasch & Birch, LLP

(57) ABSTRACT

An image capturing apparatus or reproducing apparatus which allows a user to easily obtain a desirable sound and image is provided. The image capturing apparatus or reproducing apparatus includes: an image capturing section for capturing an image of a subject; a recording section for recording a sound surrounding the image capturing section; a threshold sound volume storage section for storing a specified threshold sound volume; a sound extraction section for extracting the sound within a part of period including the sound having the volume larger than the threshold sound volume stored in the threshold sound volume storage section among the sound recorded by the recording section; a data storage section for associating each of a plurality of images captured by the image capturing section with each of a plurality of sounds extracted by the sound extraction section in the order of capturing and recording, and for storing the same; and a data output section for synchronizing the captured image with the sound which are associated and stored in the data storage section and outputting the same.

16 Claims, 13 Drawing Sheets

IMAGE CAPTURING APPARATUS, IMAGE CAPTURING METHOD, REPRODUCING APPARATUS, REPRODUCING METHOD AND PROGRAM

CROSS REFERENCE TO RELATED APPLICATION

The present application claims priority from Japanese Patent Applications Nos. JP 2004-374691 filed on Dec. 24, 2004 and JP 2004-368367 filed on Dec. 20, 2004, the contents of which are incorporated herein by reference.

BACKGROUND OF THE INVENTION

1. Field of the Invention

The present invention relates to an image capturing apparatus, an image capturing method, a reproducing apparatus, a reproducing method and a program. Particularly, the present invention relates to an apparatus and a method for capturing images, an apparatus and a method for reproducing images and a program for the image capturing apparatus and the reproducing apparatus.

2. Related Art

Conventionally, a digital still camera which can record not only static images but also moving images on a memory card, associate a sound detected by a microphone at capturing the static images and the moving with the images and record the same is known as described in Patent Application Publication No. 7-154734, for example.

For example, however capturing the images of birds using such camera, a surrounding noise is recorded along with the chirp of birds, so that the reproduced sound is not good. In that case, the sound other than the chirp of birds is eliminated, or the sound recorded when the surrounding noise is less is reproduced, so that the images can be preferably viewed. Additionally, it is favorable for users that images and sounds are easily appreciated without complicated works such as editing the images and sounds after image-capturing.

SUMMARY OF THE INVENTION

Thus, an object of the present invention is to provide an image capturing apparatus, an image capturing method, a reproducing apparatus, a reproducing method and a program which can solve the above-described problem. This object is achieved by combining the features recited in independent claims. Then, dependent claims define further effective specific example of the present invention.

The image capturing apparatus according to a first aspect of the present invention includes an image capturing section for capturing an image of a subject, a recording section for recording a sound surrounding the recording section, a threshold sound volume storage section for storing a specified threshold sound volume, a sound extraction section for extracting the sound within a part of period including the sound having the volume larger than the threshold sound volume stored in the threshold sound volume storage section, a data storage section for associating the image captured by the image capturing section with the sound extracted by the sound extraction section and storing the same and a data output section for synchronizing the captured image with the sound which are associated and stored in the data storage section and outputting the same.

The data storage section may associate each of a plurality of images captured by the image capturing section with each of a plurality of sounds extracted by the sound extraction section in the order of image-capturing and recording and store the same.

The image capturing apparatus further includes a sound correcting direction control section for controlling the recording section to collect the sound in a direction approximately same as the capturing direction of the image capturing section and record the same when the mode setting section set the capturing mode, and to collect the sound in a direction wider than the direction of the capturing mode set by the mode setting section and record the same when the mode setting section set the standby mode.

The data storage section may associate each of the captured images by the image capturing apparatus with each of the sounds extracted by the sound extraction section in the captured and recorded order and store the same.

The image capturing apparatus may further includes a sound storage section for storing the sound recorded by the recording section and a threshold sound volume setting section for setting the threshold sound volume stored in the threshold sound volume storage section based on the sound volume distribution stored in the sound storage section. The threshold sound volume setting section may set the threshold sound volume stored in the threshold sound volume storage section to be larger when the average of the volume of the sound stored in the sound storage section is larger.

The image capturing apparatus may further includes a threshold sound volume setting section for setting the threshold sound volume stored in the threshold sound volume storage section such that the total of the period of the plurality of sounds extracted by the sound extraction section is equal to the period obtained by multiplying the number of images captured by the image capturing section by a predetermined time for reproducing the captured images. The threshold sound volume storage section may associate the threshold sound volume for each band with each of a plurality of frequency bands and store the same. The sound extraction section may compare the sound volume recorded by the recording section for each frequency band with the threshold sound volume for each band stored in the threshold sound volume storage section and extract the sound within a part of period including the sound having the volume larger than the threshold sound volume in the specified frequency band.

The image capturing apparatus may further include an environment identification section for identifying the environment surrounding the image capturing apparatus, a variable filter section for transmitting the sound within the specified frequency band and a band control section for setting the frequency band of the sound transmitted through the variable filter based on the environment identified by the environment identification section. The recording section may record the sound transmitted through the variable filter section.

The image capturing apparatus may further include a position detection section for detecting the position of the image capturing apparatus and an environment information storage section for associating information indicative of the environment with information indicative of the position and storing the same. The environment identification section may retrieve the environment information storage section based on the position detected by the position detection section to identify the environment surrounding the image capturing apparatus.

The image capturing apparatus may further include a time detection section for detecting a time and an environment information storage section for associating information indicative of the time with information indicative of the environment and storing the same. The environment identification section may retrieve the environment information storage section based on the time detected by the time detection section based on the time detected by the time detection section and identify the environment surrounding the image capturing apparatus.

The image capturing apparatus according to a second aspect of the present invention includes an image capturing section for capturing an image of a subject, a recording section for recording a sound surrounding the recording section, a mode setting section for setting an operation mode indicative of the type of operating states of the image capturing section and the recording section, a recording control section for controlling the recording section to record the sound larger than a preset setting volume, a sound storage section for storing the sound recorded by the recording section, and a recording sound volume setting section for setting a setting sound volume based on the operation mode set by the mode setting section.

The image capturing apparatus may further includes a sound collection section for collecting the sound surrounding the image capturing section to cause the recording section to record the same. The recording sound setting section may change the sensitivity of the sound collection section based on the operation mode set by the mode setting section to set the setting sound volume. Additionally, the recording sound volume setting section may change the threshold sound volume of the sound to be recorded by the recording section based on the operation mode set by the mode setting section.

The mode setting section may selectively set a standby mode in which the image capturing section can accept a user operation and an image capturing mode in which the image capturing section has accepted the user operation and is operating. The recording sound setting section may set a first setting sound volume to be recorded by the recording section when the mode setting section sets the standby mode, and alternatively sets a second setting sound volume less than the first setting sound volume when the mode setting section sets the image capturing mode.

The image capturing apparatus further includes a distance measurement section for measuring the distance between the image capturing section and the subject. The recording sound volume setting section may set the setting sound volume based on the distance measured by the distance measurement section. Additionally, the recording sound volume setting section may set the setting sound volume to be smaller when the distance measured by the distance measurement section is larger.

The mode setting section may selectively set a standby mode in which the image capturing section can accept a user operation and an image capturing mode in which the image capturing section has accepted the user operation and is operating. Additionally, the ode setting section further includes a sound collecting direction control section for collecting the sound in the direction approximately equal to the image capturing direction of the image capturing section and causes the recording section to record the same when the mode setting section sets the image capturing mode, and alternatively collects the sound in the direction wider than that for the image capturing mode set by the mode setting section and causes the recording section to record the same when the mode setting section sets the standby mode.

The image capturing apparatus may further includes a first sound collecting section having a sound collection directivity in the direction approximately equal to the image capturing direction of the image capturing section and a second sound collecting section having a sound collection directivity in the direction wider than that of the first sound collecting section. The sound collecting direction control section may control the recording section to record the sound collected by the first sound collecting section when the mode setting section sets the image capturing mode, and control the recording section to record the sound collected by the second sound collecting section when the mode setting section sets the standby mode.

An image capturing method according to a third aspect of the present invention includes the steps of: capturing a image of a subject using an image capturing section; recording the sound surrounding the image capturing section; storing a specified threshold sound volume; extracting the sound within a part of period including the sound having the volume larger than the threshold sound volume stored in the threshold sound volume storing step; associating the image captured by image capturing section with the sound extracted in the sound extracting step and storing the same; and synchronizing the image with the sound which are associated and stored in the data storing step and outputting the same.

An image capturing method according to a fourth aspect of the present invention includes the steps of: capturing a image of a subject using an image capturing section; recording the sound surrounding the image capturing section; setting an operation mode indicative of the type of operating states of the image capturing section and the recording section; controlling the recording section to record the sound larger than a preset setting sound volume among the sound surrounding the image capturing section; storing the sound recorded by the recording section; and setting the setting sound volume based on the operation mode set in the mode setting step.

According to a fifth aspect of the present invention, a program for an image capturing apparatus for capturing images is provided. The program operates the image capturing apparatus to function as: an image capturing section for capturing an image of a subject; a recording section for recording a sound surrounding the image capturing section; a threshold sound volume storage section for storing a specified threshold sound volume; a sound extraction section for extracting the sound within a part of period including the sound having the volume larger than the threshold sound volume stored in the threshold sound volume storage section; a data storage section for associating the captured image by the image capturing section with the sound extracted by the sound extraction section and storing the same; and a dada output section for synchronizing the captured image with the sound which are associated and stored in the data storage section and outputting the same.

According to a sixth aspect of the present invention, a program for an image capturing apparatus for capturing images is provided. The program operates the image capturing apparatus to function as: an image capturing section for capturing an image of a subject; a recording section for recording a sound surrounding the image capturing section; a mode setting section for setting an operation mode indicative of the type of operating states of the image capturing section and the recording section; a recording control section for controlling the recording section to record a sound having the volume larger than the preset setting sound volume among the sound surrounding the image capturing section; a sound storage section for storing the sound recorded by the recording section; and recording sound volume setting section for setting a setting sound volume based on the operation mode set by the mode setting section;

According to a seventh aspect of the present invention, a reproducing apparatus is provided. The reproducing apparatus includes: a captured image storage section for storing an image captured by an image capturing apparatus; a sound storage section for storing the sound recorded by the image capturing apparatus; a threshold sound volume storage section for storing the threshold sound volume; a sound extraction section for extracting the sound within a part of the period including the sound having the volume larger than the threshold sound volume stored in the threshold sound volume storage section among the sound stored in the sound storage section and; a data storage section for associating the captured image stored in the captured image storage section with the sound extracted by the sound extraction section and storing the same; and a data output section for synchronizing the captured image with the sound which are associated and stored in the data storage section and outputting the same.

The reproducing apparatus may further includes an allowed time storage section for storing a specified allowed time. The captured image storage section may associate the captured image with the time at which the image is captured by the image capturing apparatus and store the same. The sound storage section may associate the sound with the time at which the sound is recorded by the image capturing apparatus and store the same. The sound extraction section may extract the sound within a part of period including the sound having the volume larger than the threshold sound volume stored in the threshold sound volume storage section among the sound recorded at the time within the allowed time stored in the allowed time storage section.

The reproducing apparatus may further include an instruction reception section for receiving the instruction on reproducing the captured image stored in the captured image storage section, a time detection section for detecting the time at which the instruction reception section receives the instruction, and an allowed time control section for setting the allowed time stored in the allowed time storage section to be longer in proportion to the magnitude of the difference between the time at which the captured image stored in the captured image storage section is captured and the time detected by the time detection section.

The reproducing apparatus may further include a threshold sound volume setting section for setting the threshold sound volume stored in the threshold sound volume storage section based on the volume distribution of the sound stored in the sound storage section. The threshold sound volume setting section may set the threshold sound volume stored in the threshold sound volume storage section to be larger when the average of the volume of the sound stored in the sound storage section is larger.

According to an eighth aspect of the present invention, a reproducing method is provided. The reproducing method includes the steps of: storing a image captured by an image capturing apparatus; storing a sound recorded by the image capturing apparatus; storing a threshold sound volume; extracting the sound within a part of period including the sound having the volume larger than the threshold sound volume stored in the threshold sound volume storing step among the sound stored in the sound storing step; associating the captured image stored in the captured image storing step with the sound extracted in the sound extracting step and storing the same; and synchronizing the captured image with the sound which are associated and stored in the data storing step and outputting the same.

According to a ninth aspect of the present invention, a program for a reproducing apparatus for reproducing images is provided. The program operates the reproducing apparatus to function as: a captured image storage section for storing an image captured by an image capturing apparatus; a sound storage section for storing a sound recorded by the image capturing apparatus; a threshold sound volume storage section for storing a threshold sound volume; a sound extraction section for extracting the sound within a part of the period including the sound having the volume larger than the threshold sound volume stored in the threshold sound volume storage section; a data storage section for associating the captured image stored in the captured image storage section with the sound extracted by the sound extraction section and storing the same; and a data output section for synchronizing the captured image with the sound associated and stored in the data storage section and outputting the same.

Here, all necessary features of the present invention are not listed in the summary of the invention. The sub-combinations of the features may become the invention.

According to the present invention, an image capturing apparatus or reproducing apparatus which allows users to easily acquire the desirable sound and image can be provided.

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
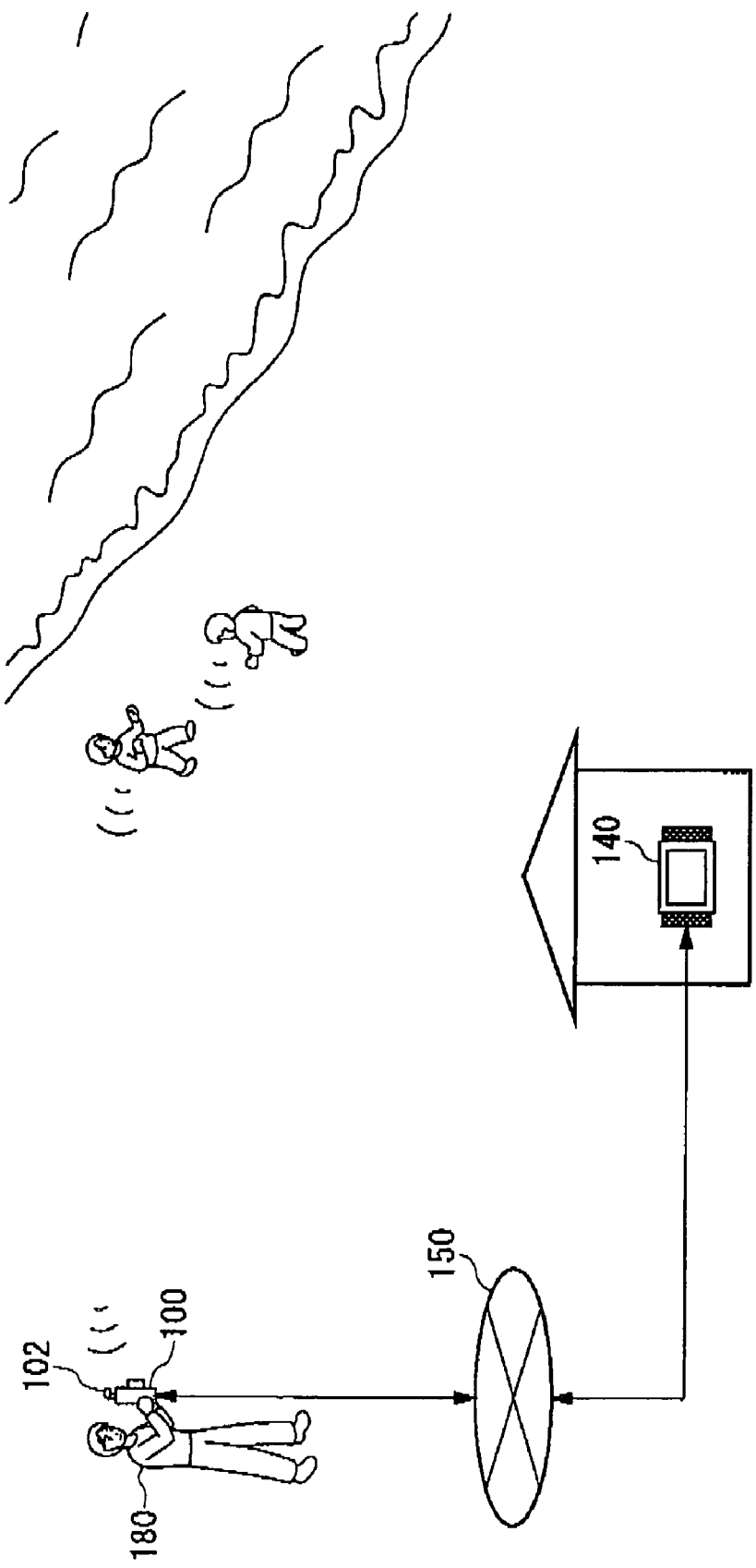
FIG. 1 shows an example of the environment for the usage of an image capturing apparatus 100 and a reproducing apparatus 140.

FIG. 1 shows an example of the environment for the usage of an image capturing apparatus 100 and a reproducing apparatus 140 according to a first embodiment of the present invention. Where, the image capturing apparatus 100 captures the images of persons play on the beach. Additionally, the image capturing apparatus 100 records the sound surrounding the image capturing apparatus 100 by a microphone 102. The image capturing apparatus 100 outputs the captured image and the recorded sound by the image capturing apparatus 100 to the recording apparatus 140 through a communication line 150 such as Internet. The reproducing apparatus 140 reproduces the sound received from the image capturing apparatus 100 during reproducing the image received from the image capturing apparatus 100.

At this time, the image capturing apparatus 100 outputs the capturing location at which the image is captured and the characteristic sound at capturing the image along with the captured image to the reproducing apparatus 140. The reproducing apparatus 140 reproduces the characteristic sound at capturing the image among the recorded sounds when the image capturing apparatus 100 reproduces the captured image. Thereby a user 180 can easily obtain the desirable sound and image.

The image capturing apparatus 100 may be such as a digital still camera and a camera cell-phone held by the user 180. The reproducing apparatus 140 may be such as a HDTV and a photo stand which can reproduce images and sounds. Additionally, the reproducing apparatus 140 may be a computer for reproducing images and sounds. The image capturing apparatus 100 may have a function for reproducing the image or sound as well as the reproducing apparatus 140. The image capturing apparatus 100 may record image and sound data on a recording medium. The reproducing apparatus may receive the data from the recording medium and reproduce the received image and sound. The image capturing apparatus 100 may store the image and sound data in the directories provided for each user 180 of the server connected to the communication line 150, such as directories associated with the image capturing apparatus 100. Then, the reproducing apparatus 140 may receive the image and sound data stored in the server for each user 180.

Figure 2:
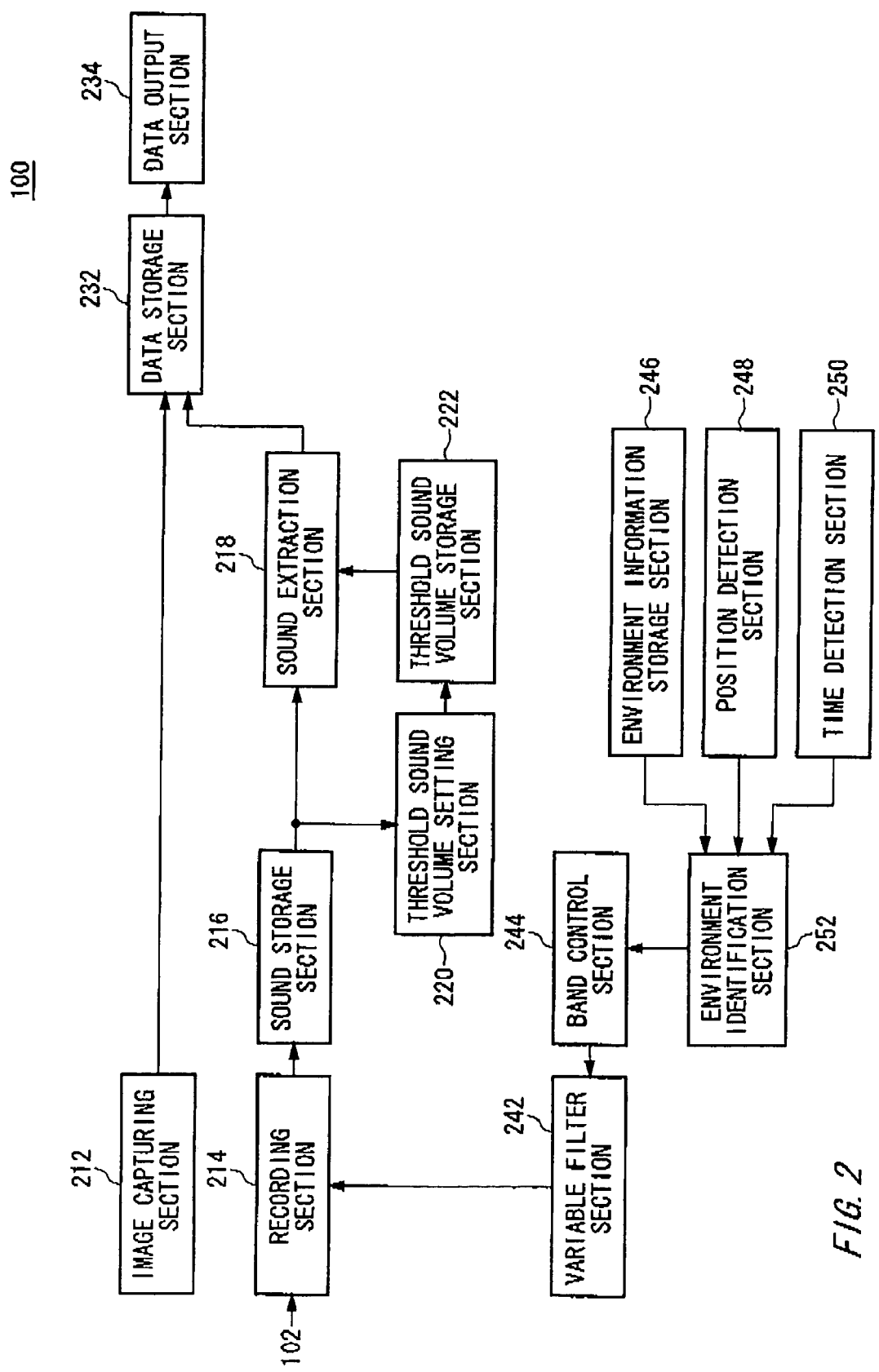
FIG. 2 shows an example of a block configuration of the image capturing apparatus 100.

FIG. 2 shows an example of a block configuration of the image capturing apparatus 100. The image capturing apparatus 100 includes an image capturing section 212, a recording section 214, a sound storage section 216, a sound extraction section 218, a threshold sound volume setting section 220, a threshold sound volume storage section 222, a data storage section 232, a data output section 234, a variable filter section 242, a band control section 244, an environment identification section 252, an environment information storage section 246, a position detection section 248 and a time detection section 250.

The image capturing section 212 captures the image of a subject. Specifically, the image capturing section 212 receives light from the subject by an image capturing device such as a CCD to capture the image of the subject. Here, the image capturing section may continuously capture images of the subject at a predetermined time interval. Then the image capturing section 212 may store the predetermined number of images obtained by continuously capturing the images. Additionally, the image capturing section 212 may select the image which is captured at the timing proximate to the time at instructing on capturing the image among the stored images as the image captured at said time.

The recording section 214 records the sound surrounding the image capturing section 212. For example, the recording section 214 records the sound collected by the microphone 102. The sound storage section 216 stores the sound recorded by the recording section 214

The threshold sound volume storage section 222 stores a specified threshold sound volume. Then the sound extraction section 218 extracts the sound within a part of period including the sound having the volume larger than the threshold sound volume stored in the threshold sound volume storage section 222.

The data storage section 232 associates the image captured by the image capturing section 212 with the sound extracted by the sound extraction section 218 and stores the same.

Specifically, the data storage section 232 associates each of a plurality of images captured of the image capturing section 212 with each of a plurality of sounds extracted by the sound extraction section 218 in the order of capturing and recording and stores the same. The data output section 234 synchronizes the captured image with the sound which are associated and stored in the data storage section 232 and outputs the same. Thereby the user 180 can easily appreciate the captured image and the sound.

Here, the threshold sound volume storage section 222 may store the threshold sound volume set by the user 180 of the image capturing apparatus 100. Additionally, the threshold sound volume storage section 222 may store the threshold sound volume set by the threshold sound volume setting section 220. The threshold sound volume setting section 220 sets the threshold sound volume stored in the threshold sound volume storage section 222 such that the total of the period of the plurality of sounds extracted by the sound extraction section 218 is equal to the period obtained by multiplying the number of the plurality of images captured by the image capturing section 212 by a predetermined reproducing time of the captured image.

The threshold sound volume setting section 220 may set the threshold sound volume stored in the threshold sound volume storage section 222 based on the volume distribution of the sound stored in the sound storage section, Specifically, the threshold sound volume setting section 220 may set the threshold sound volume stored in the threshold sound volume storage section 222 to be larger when the volume distribution stored in the sound storage section 216 converges to the direction to which the sound volume is larger. Specifically, the threshold sound volume setting section 220 may set the threshold sound volume stored in the threshold sound volume storage section 222 to be larger when the average of the volume of the sound stored in the sound storage section 216 is larger.

Additionally, the threshold sound volume storage section 222 may associate the threshold sound volume for each band with each of a plurality of frequency bands. Then, the sound extraction section 218 may compare the sound volume recorded by the recording section 214 for each frequency band with the threshold sound volume for each band stored in the threshold sound volume storage section 222 and extract the sound within a part of period including the sound having the volume larger than the threshold sound volume for each band in the specified frequency band. Thereby the user 180 can appreciate the sound with the desirable frequency band for the captured image along with the captures image. For example, when the threshold sound volume within the frequency band 100 Hz-4000 Hz is set to be lower, the user 180 can easily appreciate as associating the image on which a person who plays on the amusement park is shown with the person's voice.

The environment information storage section 246 associates information indicative of the environment with information indicative of the position and stores the same. Specifically, the environment information storage section 246 associates the longitude and latitude information with the environment information at the longitude and latitude and stores the same. The environment information may be information indicative of nature such as a sea, a mountain and a river. Additionally, the environment information may be information indicative of an environment used by persons such as an amusement park, a sports stadium and a concert hall.

The position detection section 248 detects the position of the image capturing apparatus 100. For example, the position detection section 248 receives the longitude and latitude information from the Global Positioning System satellite to identify the longitude and latitude of the image capturing apparatus 100.

The environment identification section 252 retrieves the environment information storage section 246 based on the position detected by the position detection section 248 to identify the environment surrounding the image capturing apparatus 100. For example, the environment identification section 252 retrieves the environment information storage section 246 to identify the environment information corresponding to the longitude and latitude information detected by the position detection section 248.

Additionally, the environment information storage section 246 associates information indicative of the environment with information indicative of the time and stores the same. For example, the environment information storage section 246 associates the time including the date with the season and stores the same.

The time detection section 250 detects a time. Then, the environment identification section 252 retrieves the environment information storage section 246 based on the time detected by the time detection section 250 to identify the environment surrounding the image capturing apparatus 100. For example, the environment identification section 252 retrieves the environment information storage section 246 to identify the season matching the time detected by the time detection section 250.

The band control section 244 sets the frequency band of the sound transmitted through the variable filter 242 according to the environment surrounding the image capturing apparatus 100 identified by the environment identification section 252. The variable filter section 242 transmits the sound within the frequency band set by the band control section 244. Then, the recording section 214 records the sound transmitted through the variable filter section 242.

Therefore, the user 180 can record the sound within the desirable frequency band according to the environment and the time on/at which the image is captured using the image capturing apparatus 100.

Figure 3:
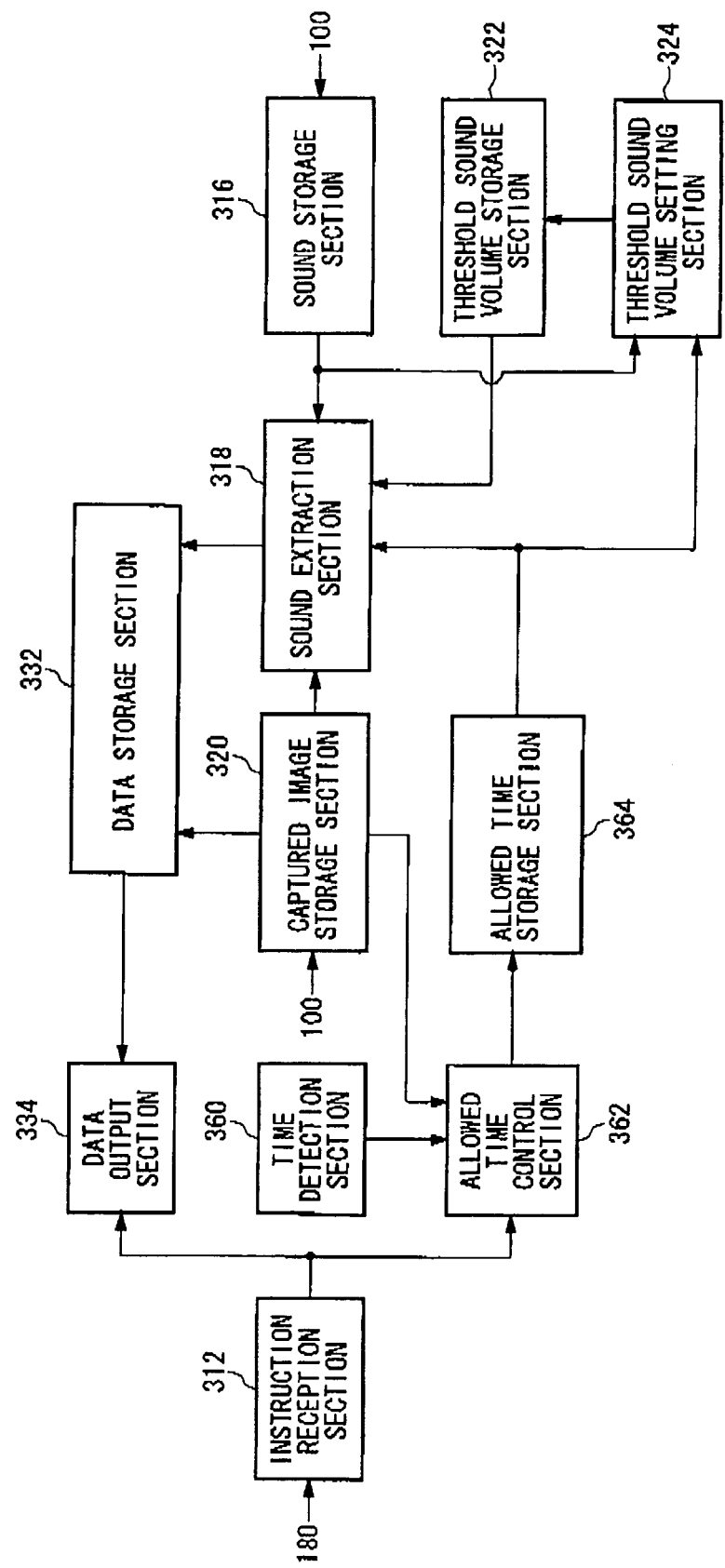
FIG. 3 shows an example of a block configuration of the reproducing apparatus 140.

FIG. 3 shows an example of a block configuration of the reproducing apparatus 140. The reproducing apparatus 140 includes a sound storage section 316, a sound extraction section 318, a captured image storage section 320, a data storage section 332, a data output section 334, an instruction reception section 312, an allowed time control section 362, an allowed time storage section 364, a time detection section 360, a threshold sound volume storage section 322 and a threshold sound volume setting section 324.

The captured image storage section 320 stores the image captured by the image capturing apparatus 100. The sound storage section 316 stores the sound recorded by the image capturing apparatus 100. Specifically, the captured image storage section 320 associates the captured image with the time at which the image is captured by the image capturing apparatus 100 and stores the same. Additionally, the sound storage section 316 associates the sound with the time at which the sound is recorded by the image capturing apparatus 100 and stores the same.

The threshold sound volume storage section 322 stores a threshold sound volume. The sound extraction section 318 extracts the sound within a part of period including the sound having the volume larger than the threshold sound volume stored in the threshold sound volume storage section 322 among the sound stored in the sound storage section 316.

The data storage section 322 associates the captured image stored in the captured image storage section 320 with the sound extracted by the sound extraction section 318 and stores the same. The instruction reception section 312 receives the instruction on reproducing the captured image stored in the captured image storage section 320. The instruction reception section 312 receives the instruction from the user 180, for example. The data output section 334 synchronizes the captured image with the sound which are associated and stored in the data storage section 232 and outputs the same.

The allowed time storage section 364 stores a specified allowed time. The sound extraction section 318 extracts the sound within a part of period including the sound having the volume larger than the threshold sound volume stored in the threshold sound volume storage section 222 among the sound recorded at the times within the allowed time stored in the allowed time storage section 364 before/after the time at which the captured image stored in the captured image storage section 320 is captured.

Specifically, the sound extraction section 318 extracts the sound within a part of period including the sound having the volume larger than the threshold sound volume stored in the threshold sound volume storage section 222 among the sound recorded before/after the time at which the captured image stored in the captured image storage section 320 is captured by the allowed time stored in the allowed time storage section 364.

The threshold sound volume setting section 324 sets the threshold sound volume stored in the threshold sound volume storage section 322 such that the total of the period of a plurality of sounds extracted by the sound extraction section 318 is equal to a predetermined reproducing time of the captured image.

The time detection section 360 detects the time at which the instruction is received by the instruction reception section 312. Then, the allowed time control section 362 sets the allowed time stored in the allowed time storage section 364 to be longer in proportion to the magnitude of the difference between the time at which the captured image stored in the captured image storage section 320 is captured and the time detected by the time detection section 360. Therefore, the reproducing section 140 can reproduce the image captured in the distant past along with more characteristic sound selected from the sound recorded within wider times. Additionally, the reproducing section 140 can select the image captured in the near past among the sound recorded around the image-captured time and reproduce the same, so that the reproduced sound for the captured image can be natural.

The threshold sound volume setting section 324 may set the threshold sound volume stored in the threshold sound volume storage section 322 based on the volume distribution of the sound stored in the sound storage section 316. Specifically, the threshold sound volume setting section 324 may set the threshold sound volume stored in the threshold sound volume storage section 322 to be larger when the volume distribution of the sound stored in the sound storage section 316 converges to the direction to which the sound volume is larger. More specifically, the threshold sound volume setting section 324 may set the threshold sound volume stored in the threshold sound volume storage section 322 to be larger when the average of the volume of the sound stored in the sound storage section 316 is larger.

Figure 4:
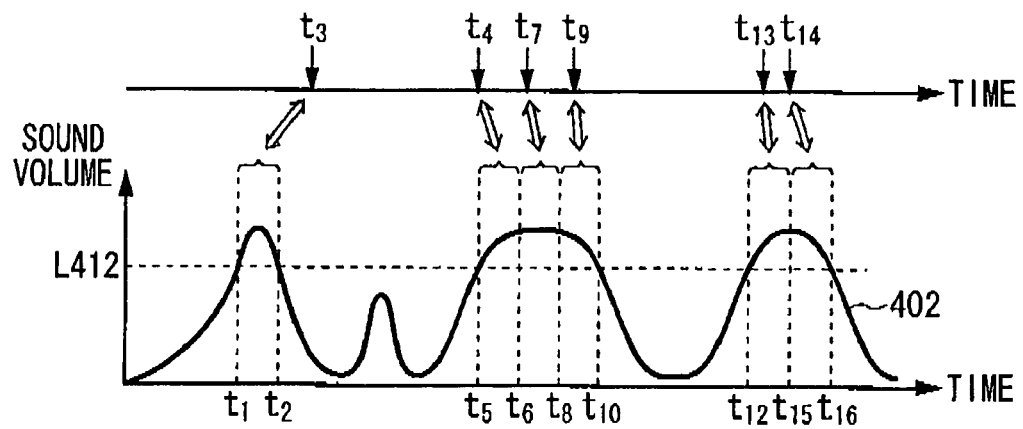
FIG. 4 shows an example of the relationship between a captured image and a sound.

FIG. 4 shows an example of the relationship between a captured image and a sound. The image capturing section 212 stores six images sequentially captured in the order of t3, t4, t7, t9, t13 and t14. Then, the sound storage section 216 associates the sound recorded by the recording section 214 with the time and stores the sound having the volume shown as a sound volume waveform 402.

A threshold sound volume L412 is set in the threshold sound volume storage section 222. Then, the sound extraction section 218 extracts the sound having the volume larger than the threshold sound volume L412 stored in the threshold sound volume storage section 222 among the sound with the sound volume waveform 402. At this time, the threshold sound volume setting section 220 sets the threshold sound volume L412 such that the period obtained by summing the period larger than the threshold sound volume L412 (t1-t2, t5-t10 and t12-t16) of the sound volume waveform 402 is equal to the total time for reproducing the six images captured by the image capturing section 212. Then, the data storage section 232 associates each of the images captured by the image capturing section 212 with the sound for each reproducing time among the sound within the period extracted by the sound extraction section 218 in the order of capturing and stores the same.

Specifically, the data storage section 232 associates the image captured at the time t3 with the sound recorded at the time (t1-t2) and stores the same. Additionally, the data storage section 232 associates the images captured at the times (t4, t7, and t9) with a period (t5-t6), a period (t6-t8) and a period (t8-t10) which are divided by the reproducing time, respectively among the sound recorded at a period (t5-t10) and stores the same. The data storage section 232 associates the images captured at the time t13 and the t14 with the sound recorded in a period (t12-t15) and a period (t15-16), respectively in the same way. Here, each of the time (t1-t2), the period (t5-t6), the period (t6-t8), the period (t8-t10), the period (t12-15) and the period (t15-16) is equal to a preset reproducing time for ease of explanation. Therefore, the user 180 can easily associate the captured image with the sound only by recording the sound surrounding the image during capturing the image using the image capturing apparatus 100.

Here, the sound volume and the threshold sound volume may include a sound pressure. Additionally, the sound volume and the threshold volume may include a loudness corresponding to the acoustic sense of the human.

Figure 5:
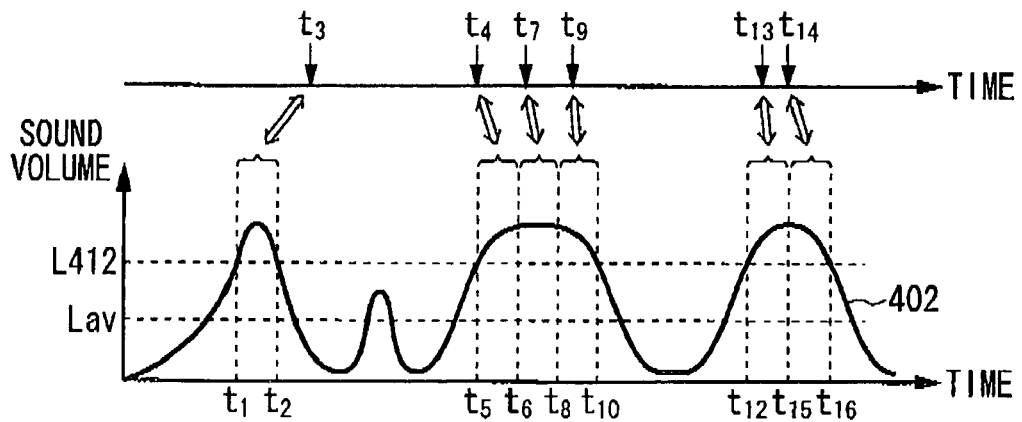
FIG. 5 shows another example of the relationship between a captured image and a sound.

FIG. 5 shows another example of the relationship between a captured image and a sound. The image capturing section 212 stores six images sequentially captured in the order of time t3, t4, t7, t9, t13 and t14. Then the sound storage section 216 stores the sound having the volume shown as the sound volume waveform 402 which is recorded by the recording section 214. In this case, the threshold sound volume setting section 220 calculates an average sound volume Lav regarding a time from the sound volume waveform stored in the sound storage section 216. Then, the threshold sound volume setting section 220 causes the threshold sound volume storage section 222 to store a sound volume threshold L412 obtained by multiplying the calculated average sound volume Lav by a predetermined coefficient (e.g. a coefficient more than 1). Then, the sound extraction section 218 extracts the sound having the volume larger than the threshold sound volume L412 stored in the threshold sound volume storage section 222 among the sound with the sound volume waveform 402, such as the period (t1-t2, t5-t10 and t12-t16). Here, the data storage section 232 associates the sounds with the images within the period extracted by the sound extraction section 218 in the order of the time at which the image is captured as well as described with reference to FIG. 4.

As described above, the threshold sound volume setting section 220 can set the appropriate threshold value according to the average volume of sound stored in the sound storage section 216. Here, when the total of the period of sound having the volume larger than the threshold sound volume L412 set by the threshold sound volume setting section 220 is shorter than the period obtained by multiplying the time for reproducing an image by the number of images, the data storage section 232 may associate each of the sound within the period obtained by dividing the total of the period by the number of images with images in the order of the time at which the image is captured and store the same. Alternatively, when the total of the period for sounds having the volume larger than the threshold sound volume L412 set by the threshold sound volume setting section 220 is longer than the period obtained by multiplying the time for reproducing an image by the number of images, the data storage section 232 may select a sound within the period different from the sound within the period which is associated with the other image and is proximate to the time at which the image is captured, associate the selected sound with the image and store the same.

Figure 6:
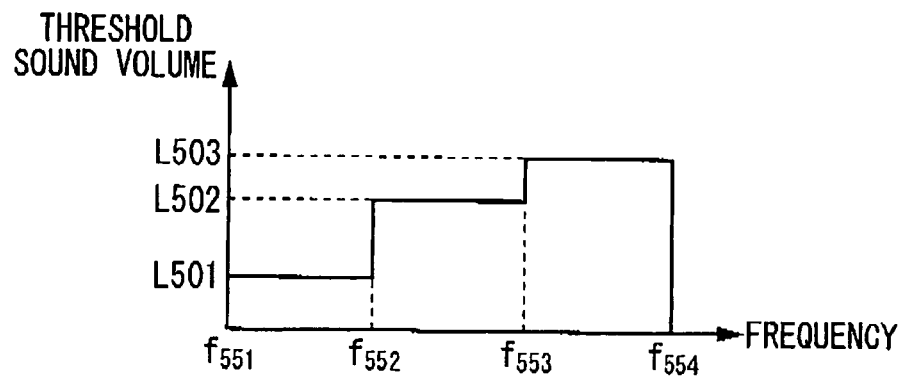
FIG. 6 shows an example of the threshold sound volume set for each frequency band.
Figure 6:
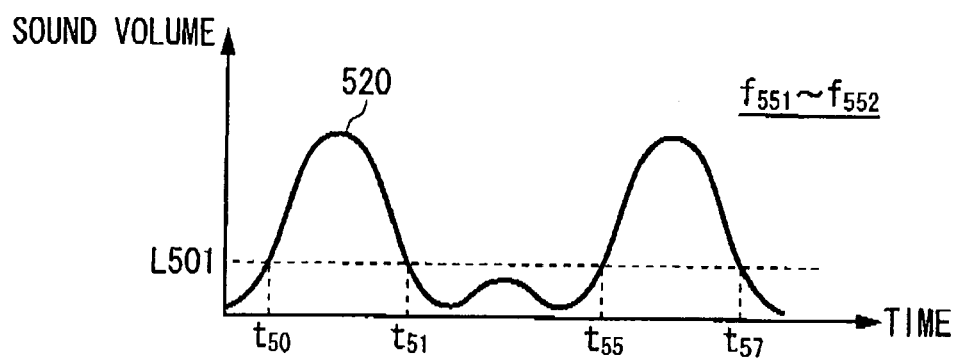
Figure 6:
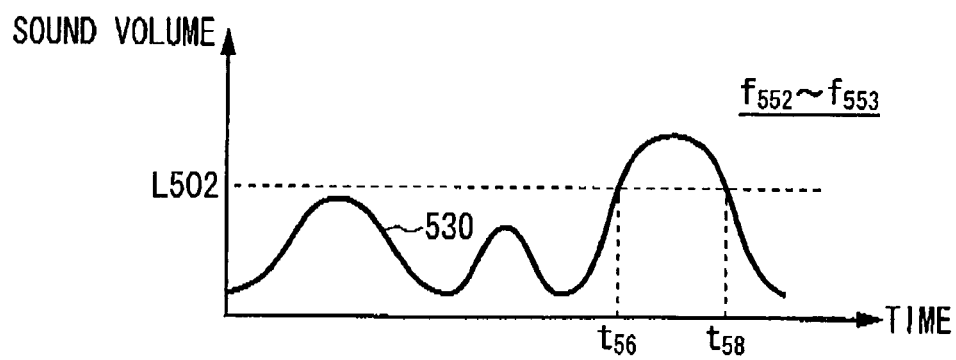
Figure 6:
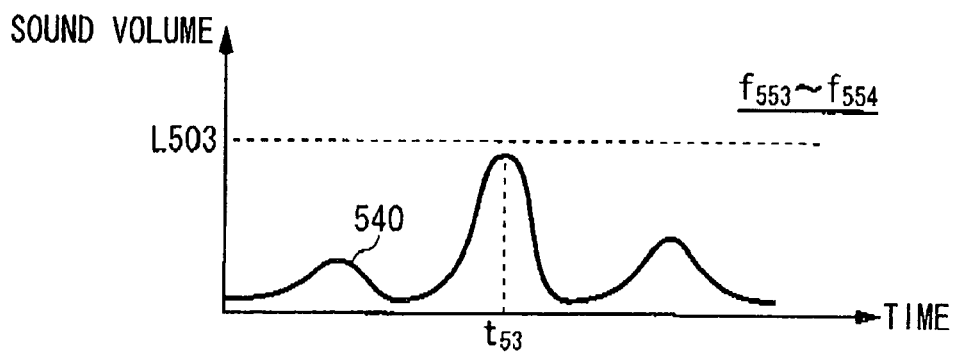

FIG. 6 shows an example of the threshold sound volume set for each frequency band. For example, the threshold sound volume storage section 222 stores a threshold sound volume L 501, a threshold sound volume L502 and a threshold sound volume L503 as the threshold sound volume for each of the sounds within the frequency band of frequency f551-f552, frequency f552-553 and frequency f553-554, respectively. A sound volume waveform 520, a sound volume waveform 530 and a sound volume waveform 540 in FIG. 6 represents the time evolution of the sound volume for each frequency band f551-f552, the frequency f552-553 and the frequency f553-554, respectively.

The sound extraction section 218 detects a period (t50-t51) and a period (t55-t57) including the sound volume larger than the threshold sound volume L501 in the frequency f551-f552 and a period (t56-t58) including the sound volume larger than the threshold sound volume L502 in the frequency f552-f553. The sound extraction section 218 extracts the sound within the period (t50-t51) and the period (t55-t58) having the volume larger than the threshold sound volume within any frequency band.

In this case, the threshold sound volume L503 within f553-f554 set to be larger than the threshold sound volume L502 and the L501, so that the sound in which the large volume is located within the frequency f553-f554 around the time t53 is prevented from extracting by the sound extraction section 218. Therefore, it can be prevented that the captured image by the image capturing apparatus 100, of which subject is a bird is associated with the whisper of persons surrounding the image capturing apparatus 100, for example. Thereby the image capturing apparatus 100 can associate the sound of which volume is large in the desirable frequency band with the captured image and provide the same to the user 180.

Figure 7:
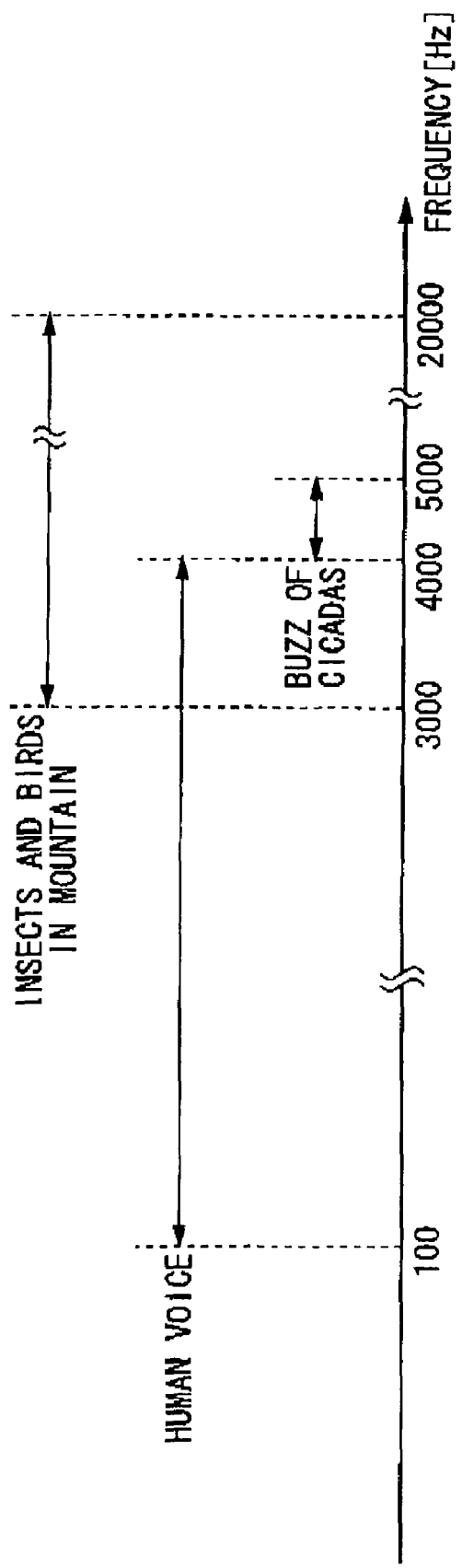
FIG. 7 shows an example of the frequency band within which the sound is transmitted through a variable filter section 242.

FIG. 7 shows an example of the frequency band of the sound transmitted through the variable filter section 242. The band control section 244 sets the frequency band of the sound transmitted through the variable filter section 242 according to the environment surrounding the image capturing apparatus 100 identified by the environment identification section 252. Specifically, the environment information storage section 246 associates the latitude and longitude information with the environment information at the latitude and longitude and stores the same. The environment information may be information indicative of natural environment such as a see, a mountain and a river. Additionally, the environment information may be information indicative of an environment used by persons such as an amusement park, a sports stadium and a concert hall.

The position detection section 248 receives the longitude and latitude information from the Global Positioning System satellite to identify the longitude and latitude of the image capturing apparatus 100, for example. Then, the environment identification section 252 retrieves the environment storage section 246 to identify the environment corresponding to the longitude and latitude information detected by the position detection section 248. The band control section 244 determines the frequency band which can be transmitted through the variable filter section 242 in order to record the sound within the frequency band according to the environment information detected by the environment identification section 252.

For example, the band control section 244 causes the variable filter section 242 to transmit the sound within the frequency band 3000 Hz-2000 Hz in order to mainly record such as sound of insects and bird call in the mountain by the recording section 214 when the environment identified by the environment identification section 252 is the mountain. Additionally, the band control section 244 causes the variable filter section 242 to transmit the sound including the frequency band 100 Hz-4000 Hz in order to record such as shouts of joy of persons when the environment identified by the environment identification section 252 is the amusement park.

Additionally, the band control section 244 may control the frequency band of the sound transmitted through the variable filter section 242 according to the time detected by the time detection section 250. Specifically, the environment information storage section 246 associates the time including the date with the season and stores the same. Then, the environment identification section 252 retrieves the environment information storage section 246 to identify the season matching the time detected by the time detection section 250. Here, if the environment identification section 252 identifies that the season is summer, the band control section 244 causes the variable filter section 242 to transmit the frequency band including the frequency band (4000 Hz-5000 Hz) such as buzzing of cicadas.

Therefore, the user 180 can easily record the desirable sound according to the environment or time on/at which the image is captured by the image capturing apparatus 100.

The image capturing apparatus 100 according to the present embodiment can easily provide the captured image with which the desirable sound is associated to the user 180. Therefore, the user 180 can enjoyably capture images without caring about the sound to be recorded associated with the captured image.

Figure 8:
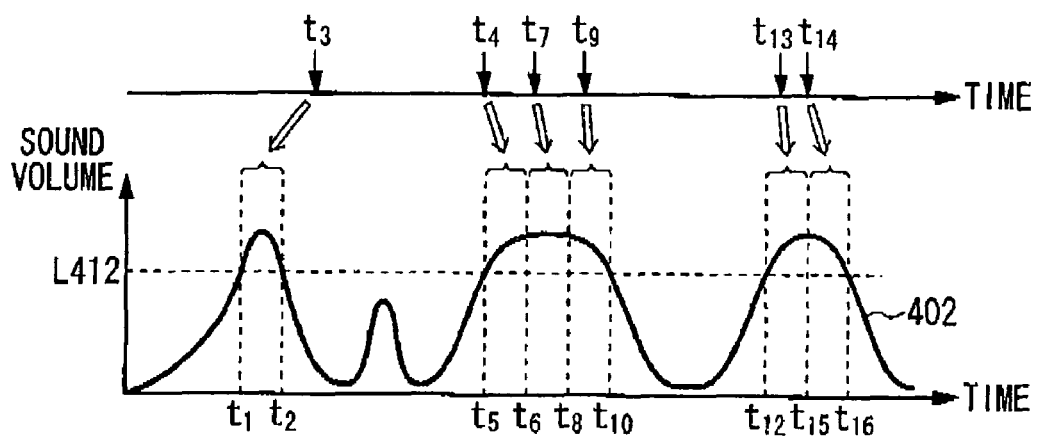
FIG. 8 shows an example of the relationship between a captured image and a sound.

FIG. 8 shows an example of the relationship between a captured image and a sound. The captured image storage section 320 stores six images sequentially captured in the order of the time t3, t4, t7, t9 t13 and t14 by the image capturing apparatus 100. The sound storage section 316 associates the sound recorded by the image capturing apparatus 100 with the time and stores the sound having the volume shown as the sound volume waveform 402.

The threshold sound volume L412 is set in the threshold sound volume storage section 322. Then, the sound extraction section 318 extracts the sound having the volume larger than the threshold sound volume L412 stored in the threshold sound volume storage section 322 in the sound volume waveform 402. At this time, the threshold sound volume setting section 324 sets the threshold sound volume L412 such that the period obtained by summing the period (t1-t2, t5-t10 and t12-t16) larger than the threshold sound volume L412 among the sound volume waveform 402 is equal to the total of time for reproducing the six images captured by the image capturing apparatus 100. Then, the data storage section 332 associates each of the captured images captured by the image capturing apparatus 100 with the sound for each reproducing time among the sound within the period extracted by the sound extraction section 318 in the order of capturing the image and stores the same.

Specifically, the data storage section 332 associates the image captured at the time t3 with the sound recorded at the time (t1-t2). Additionally, the data storage section 332 associates the images captured at the time (t4, t7 and t9) with the period (t5-t6), the period (t6-t8) and the period (tb-t10) for each reproducing time among the sound recorded in the period (t5-t10), respectively and stores the same. The data storage section 332 associates the images captured at the time t13 and the time t14 with the sound recorded in the period (t12-t15) and the period (t15-t16), respectively in the same way. Here, each of the time (t1-t2), the period (t5-t6), the period (t6-t8), the period (t8-t10), the period (t12-15) and the period (t15-16) is equal to the period for a preset reproducing time for ease of explanation. Thereby the reproducing apparatus 140 records the sound surrounding the image capturing apparatus 100 while the image is captured using the image capturing apparatus 100. Therefore, the reproducing apparatus 140 can easily associate the captured image with the sound and reproduce the same.

Additionally, the threshold sound volume storage section 322 may associate the threshold sound volume for each band with each of a plurality of frequency bands and store the same. Then, the sound extraction section 318 may compare the volume of the sound for each frequency band stored in the sound storage section 316 with the threshold sound volume for each band stored in the threshold sound volume storage section 322 and extract the sound within a part of period including the sound having the volume larger than the threshold sound volume for each band in the specified frequency band.

In this case, it can be prevented that the captured image by the image capturing apparatus 100, of which subject is a bird is associated with the whisper of persons surrounding the image capturing apparatus 100 recorded by the image capturing apparatus 100 and reproduced, for example. Therefore, the reproducing apparatus 140 can associate the sound of which volume is large in the desirable frequency band with the captured image and reproduce the same.

Figure 9:
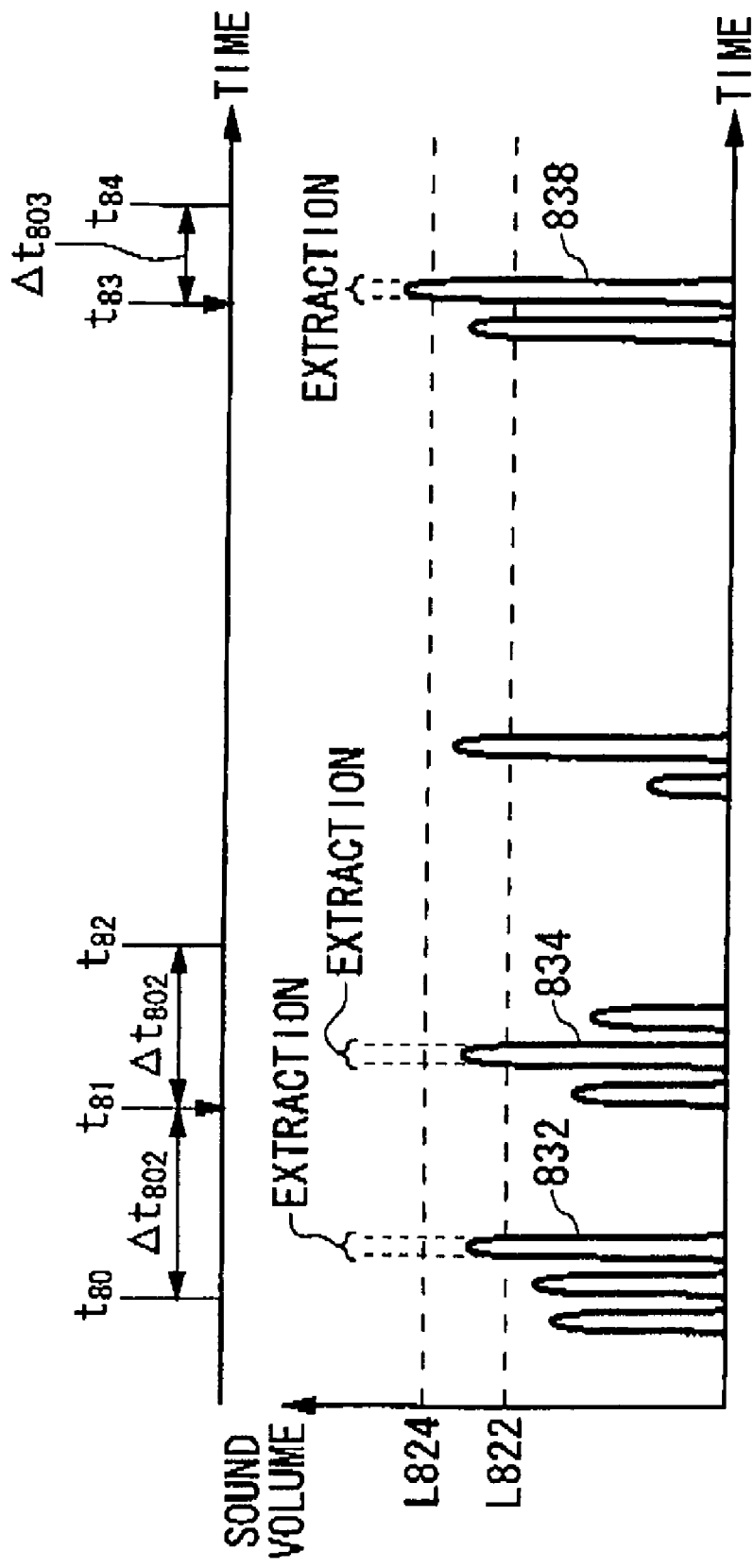
FIG. 9 shows an example of the relationship between a reproduced image and a sound.

FIG. 9 shows an example of the relationship between a reproduced image and a sound. The instruction reception section 312 receives an instruction to reproduce the image. For example, when the instruction reception section 312 receives the instruction on reproducing the image captured at the time t83, the sound extraction section 318 extracts the sound within the period including the sound having the volume larger than the threshold sound volume L824 within the time period from the allowed time Δt803 to t84 stored in the allowed time storage section 364 to extract a part of sound of a sound volume waveform 838.

Then, the allowed time control section 362 sets the allowed time stored in the allowed time storage section 364 to be longer in proportion to the magnitude of the difference between the time at which the captured image stored in the captured image storage section 320 is captured and the time at which the reproducing instruction is received. For example, the allowed time control section 362 stores an allowed time Δt802 longer than the allowed time Δt803 in the allowed time storage section 364 when the allowed time control section 362 reproduces the image captured at the image capturing time t81 before the time t83. Then, the sound extraction section 318 extracts the sound within the period including the sound having the volume larger than the threshold sound volume L834 within the time period from the time t81 to the time t82 after the allowed time Δt802, so that a part of sound of a sound volume waveform 834 can be extracted.

For example, the reproducing apparatus 140 reproduces the sound extracted among the sound recorded on the image-captured day when the image which is captured a week ago is reproduced. Additionally, in the case of that the image and the sound of the entrance ceremony, the athletic festival and the graduation ceremony in the elementary school twenty years ago are recorded, when the image on which the scene of the athletic festival is shown is reproduced by the reproduction apparatus 140, the sound to be reproduced is extracted among the sound recorded within the six years before and after the date of the athletic festival. In this case, the sounds recorded in the entrance ceremony and the graduation ceremony are also reproduced by the reproducing apparatus 140 in addition to the sound of the athletic festival in the elementary school. Therefore, the user 180 can remember a houseful of memories of the entrance ceremony and the graduation ceremony as viewing the scene of the athletic festival in the elementary school, so that the user 180 can further enjoyably appreciate the images.

Here, the threshold sound volume setting section 324 may set the threshold sound volume stored in the threshold sound volume storage section 322 such that the time for the sound to be reproduced is corresponded to a predetermined reproducing time of the captured image within the time stored in the allowed time storage section 364. For example, the threshold sound volume setting section 324 sets the threshold sound volume stored in the threshold sound volume storage section 322 to L822 such that the period including the sound having the volume larger than the threshold sound volume stored in the threshold sound volume storage section 322 corresponds to a predetermined reproducing time of the captured image within the time period t81-t82.

The sound extraction section 318 may extract a part of sound of the sound volume waveform 832 by extracting the sound within the period including the sound having the volume larger than the threshold sound volume within the time period t80-t81 before the time t83 by the allowed time Δt802 when an instruction on reproducing the image which is captured at the time t81 to extract a part of sound of a sound waveform 832. Additionally, the sound extraction section 318 may extract the sound within the sound having the volume larger than the threshold sound volume within the time period (time t80-t82) before and after the time 81*t* by the allowed time Δt802 when the image which is captured at the time t81 is reproduced.

Figure 10:
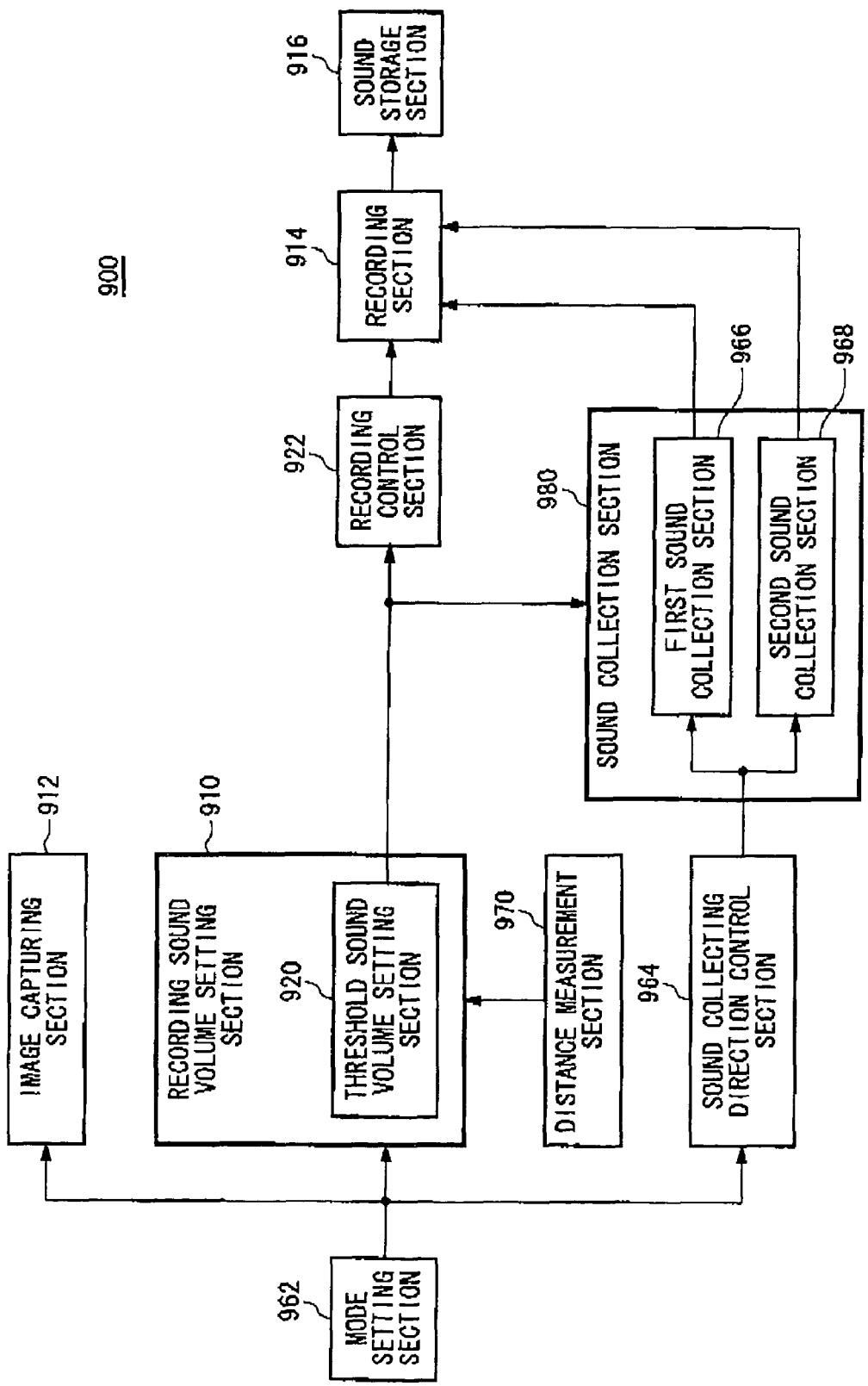
FIG. 10 shows an example of a block configuration of an image capturing apparatus 900.

FIG. 10 shows an example of a block configuration of the image capturing apparatus 900 according to the second embodiment. Here, an example of the environment for the usage of the image capturing apparatus 900 according to the second embodiment is same as that of the image capturing apparatus 100 described above with reference to FIG. 1 except for the following content, so that the description is omitted. That is to say, the image capturing apparatus 900 according to the second embodiment adjusts the recording operation of the image capturing apparatus 900 depending on the usage state, such as an image capturing state and a standby state. For example, the image capturing apparatus 900 records more characteristic sound of the subject during capturing the image of the subject.

The image capturing apparatus 900 according to the second embodiment includes an image capturing section 912, a recording section 914, a sound storage section 916, a mode setting section 962, a recording sound volume setting section 910, a recording sound control section 922, a distance measurement section 970, a sound collecting direction control section 964 and a sound collection section 980. The recording sound volume setting section 910 has a threshold sound volume setting section 920. The sound collection section 980 has a first sound collection section 966 and a second sound collection section 968. Here, the operation and the function of the image capturing apparatus 900 according to the second embodiment are same as those of the image capturing apparatus 100 according to the first embodiment except for the following content, so that the description is omitted. For example, the operation and the function of the image capturing section 912 and the recording section 914 may be same as those of the image capturing section 212 and the recording section 214. Additionally, an image capturing apparatus having the combined operation and function of the image capturing apparatus 100 according to the first embodiment and the image capturing apparatus 900 according to the second embodiment also can be invention.

The sound collection section 980 collects the sound surrounding the image capturing section 912 and causes the recording section 914 to record the same. The recording control section 922 controls the recording section 914 to record the sound having the volume larger than the preset setting sound volume among the sound surrounding the image capturing section 912. Specifically, the recording control section 922 controls the recording section 914 to record the sound having the volume larger than the preset threshold sound volume among the sound surrounding the image capturing section 912. Then, the sound storage section 916 stores the sound recorded by the recording section 914.

The mode setting section 962 sets an operation mode indicative of the type of operating states of the image capturing section 912 and the recording section 914. The recording sound setting section 910 sets the setting sound volume based on the operation mode set by the mode setting section 962. Specifically, the recording sound volume setting section 910 changes the threshold sound volume of the sound to be recorded by the recording section 914 based on the operation mode set by the mode setting section 962 to set the setting sound volume. More specifically, the threshold sound volume setting section 920 sets the threshold sound volume based on the operation mode set by the mode setting section 962. Here, the recording sound volume setting section 910 changes the sensitivity of the sound collection section 980 based on the operation mode set by the mode setting section 962 to set the setting sound volume.

Specifically, the mode setting section 962 selectively sets a standby mode in which the image capturing section 912 can accept a user operation and an image capturing mode in which the image capturing section 912 has accepted the user operation and is operating. The recording sound setting section 910 sets a first setting sound volume to be recorded by the recording section 914 when the mode setting section 962 sets the standby mode. Alternatively, the recording sound setting section 910 sets a second setting sound volume smaller than the first setting sound volume when the mode setting section 962 sets the image capturing mode. Specifically, the threshold sound volume setting section 920 sets a first threshold sound volume when the mode setting section 962 sets the standby mode. Alternatively, the threshold sound volume setting section 920 sets a second threshold sound volume smaller than the first threshold sound volume when the mode setting section 962 sets the image capturing mode. Additionally, the recording sound volume setting section 910 may set a first sensitivity of the sound collection section 980 when the mode setting section 962 sets the standby mode. Alternatively, the recording sound volume setting section 910 may set a second sensitivity larger than the first sensitivity when the mode setting section 962 sets the image capturing mode.

The distance measurement section 970 measures the distance between the image capturing section 912 and the subject. Specifically, the distance measurement section 970 may be a distance sensor for irradiating the subject with a laser beam and an infrared radiation to measure the distance based on the light reflected from the subject. Additionally, the distance measurement section 970 may detect the contrast of the captured image by the image capturing section 912 to measure the distance between the image capturing section 912 and the subject based on the control value of the image capturing section 912 at which the image with the maximum contrast is captured.

Then, the recording sound volume setting section 910 sets the setting sound volume based on the distance measured by the distance measurement section 970. Specifically, the recording sound volume setting section 910 sets the setting sound volume to be smaller when the distance measured by the distance measurement section 970 is larger. For example, the threshold sound volume setting section 920 sets the threshold sound volume based on the distance measured by the distance measurement section 970. Specifically, the threshold sound volume setting section 920 sets the threshold sound volume to be smaller when the distance measured by the distance measurement section 970 is larger. Here, the recording sound volume setting section 910 mat sets the sensitivity of the sound collection section 980 to be larger when the distance measured by the distance measurement section 970 is larger.

The recording sound volume setting section 910 sets a setting sound volume based on the distance measured by the distance measurement section 970. Specifically, the recording sound volume setting section 910 sets the setting sound volume to be smaller when the distance measured by the distance measurement section 970. For example, the threshold sound volume setting section 920 sets the threshold sound volume based on the distance measured by the distance measurement section 970. Specifically, the threshold sound volume setting section 920 sets the threshold sound volume to be smaller when the distance measured by the distance measurement section 970 is larger. Here, the recording sound volume setting section 910 may set the sensitivity of the sound collection section 980 to be larger when the distance measured by the distance measurement section 970.

The first sound collection section 966 has the sound collection directivity in the direction approximately equal to the image capturing direction of the image capturing section 912. The second sound collection section 968 has the sound collection directivity in the direction wider than that of the first sound collection section 966.

The sound collecting direction control section 964 collects the sound in the direction approximately equal to the image capturing direction of the image capturing section 912 when the mode setting section 962 sets the image capturing mode and controls the recording section 914 to record the same when the mode setting section 962 sets the image capturing mode. Alternatively, the sound collecting direction control section 964 collects the sound in the direction wider than the direction for the image capturing mode set by the mode setting section 962 and controls the recording section 914 to record the same when the mode setting section 962 sets the standby mode. Specifically, the sound collecting direction control section 964 controls the recording section 914 to record the sound collected by the first sound collection section 966 when the mode setting section 962 sets the image capturing mode. Alternatively, the sound collecting direction control section 964 controls the recording section 914 to record the sound collected by the second sound collection section when the mode setting section 962 sets the standby mode.

Additionally, the image capturing apparatus 900 may include a sound collection section which can change the sound collection directivity. Then, the sound collecting direction control section 964 may collect the sound in the direction approximately equal to the image capturing direction of the image capturing section 912 by controlling the sound collection directivity of the sound collection section and causes the recording section 914 to record the same. Additionally, the sound collecting direction control section 964 may collect the sound in the direction wider than that for the image capturing mode set by the mode setting section 962 and causes the recording section 914 to record the same when the mode setting section 962 sets the standby mode.

Figure 11:
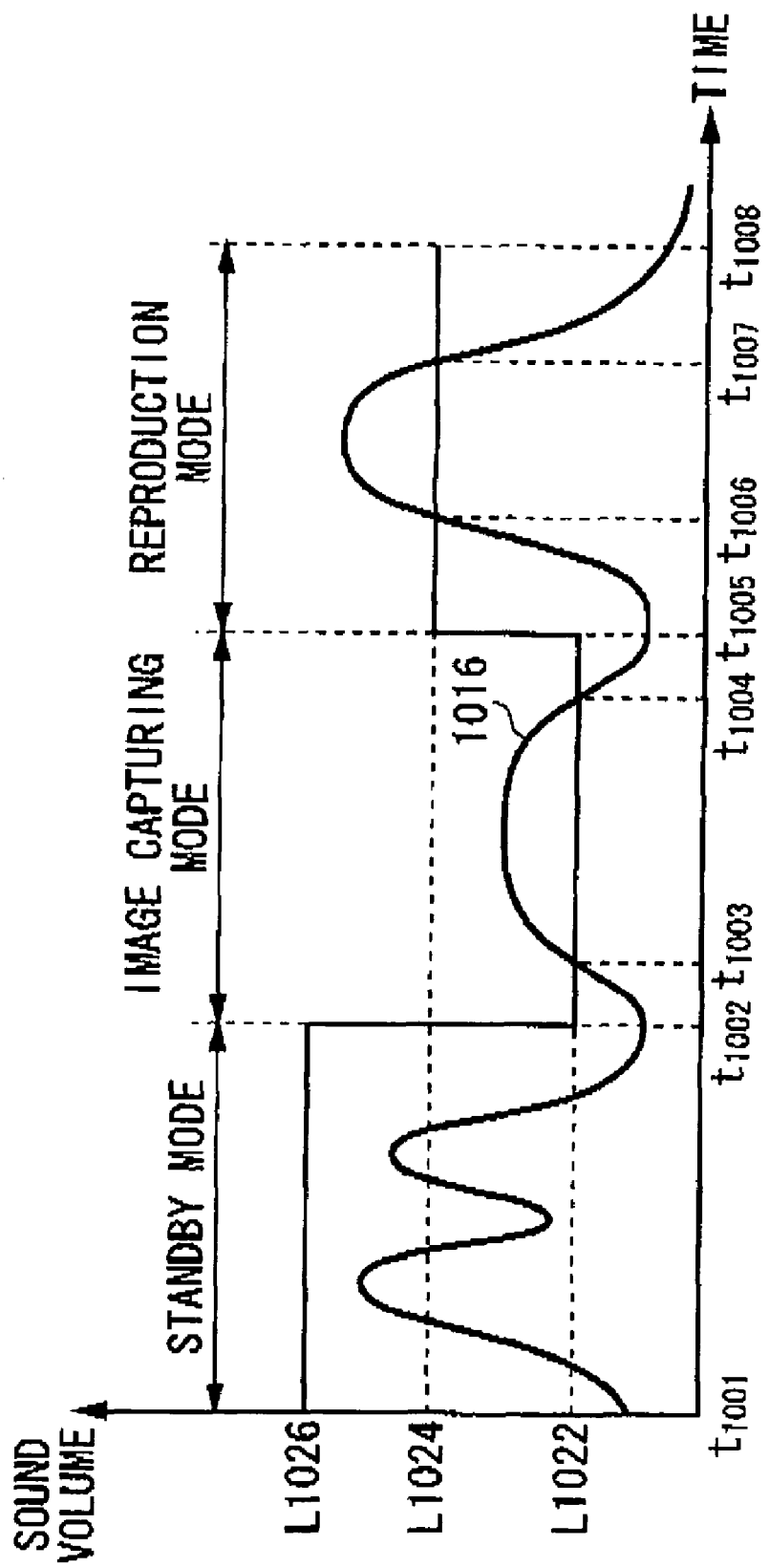
FIG. 11 shows an example of the variation with time of the threshold sound volume for each operation mode.

FIG. 11 shows an example of the variation with time of the threshold sound volume for each operation mode. The image capturing apparatus 900 has operation modes including a standby mode, an image capturing mode and a reproduction mode. The image capturing mode may be an operation mode in which the image capturing apparatus 900 can capture images and/or record sounds. The reproduction mode may be an operation mode in which the image capturing apparatus 900 can reproduce the images and/or sounds. Here, the image capturing apparatus 900 is set to the standby mode immediately after activating.

For example, the image capturing section 912 and the recording section 914 are set to the standby mode within a time period (t1001-t1002) as shown in FIG. 11. Then, the threshold sound volume setting section 920 sets the threshold sound volume to be L1026 while the image capturing section 912 and the recording section 914 are set to the standby mode. Then, the threshold sound volume setting section 920 sets the threshold sound volume to be L1022 lower than the threshold sound volume L1026 while the image capturing section 912 and the recording section 914 are set to the image capturing mode within a time period (t1002-t1005). The recording section 914 records the sound within the time period (t1003-t1004) during which the sound having the volume larger than the threshold sound volume L1022 is inputted when the sound having the sound volume waveform 1016 is inputted.

Additionally, the threshold sound volume setting section 920 may set the threshold sound volume different from the threshold sound volume L1022 or L1024 while the image capturing section 912 and the recording section 914 are set to a reproduction mode (t1005-t1008). For example, the threshold sound volume setting section 920 sets the threshold sound volume to be the threshold sound volume L1024 larger than threshold sound volume L1022 and smaller than the threshold sound volume L1026 while the threshold sound volume setting section 920 is set to the reproduction mode. The recording section 914 records the sound within the time period during which the sound having the volume larger than the threshold sound volume L1024 when the sound having the sound volume waveform is inputted in the time period.

When the image capturing apparatus 900 is set to the image capturing mode, lower threshold sound volume is set. Therefore, the user 180 can easily record the sound as capturing the image. Alternatively, when the image capturing apparatus is set to the standby mode, higher threshold sound volume is set, so that it can be prevented that such as the sound of a car engine is recorded in the standby mode when the user 180 captures the image of birds in the mountain.

The sound collecting direction control section 964 controls the direction to which the sound to be recorded by the recording section 914 is collected according to the operation mode of the image capturing section 912 and the recording section 914. Specifically, the sound collecting direction control section 964 collects the sound in the direction approximately equal to the image capturing direction of the image capturing section 912 using the first sound collection section 966 and causes the recording section 914 to record the same when the image capturing section 912 and the recording section 914 are set to the image capturing mode. Alternatively, the sound collecting direction control section 964 collects the sound in the direction wider than the direction for the image capturing mode using the second sound collection section 968 and causes the recording section 914 to record the same.

Therefore, when the image capturing apparatus 900 is set to the image capturing mode, the sound in the direction of the subject can be recorded with larger volume. Alternatively, when the image capturing apparatus 900 is set to the standby mode, the sound in wider direction is collected and recorded. Therefore, the natural sound surrounding the image capturing apparatus 900 can be recorded when the user 180 plays in the amusement park without image-capturing.

The threshold sound volume setting section 920 sets the threshold sound volume to be smaller in proportion to the magnitude of the distance between the image capturing section 912 and the subject measured by the distance measurement section 970. Therefore, the recording section 914 can easily record the sound in the direction of the subject even if the image of the subject is captured at long distance.

Meanwhile, when the image capturing section 912 and the recording section 914 are set to the reproduction mode, the sound collecting direction control section 964 may collect the sound in the direction approximately equal to the direction to which the image is displayed and control the recording section 914 to record the same. Therefore, when the user 180 record the narration for the captured image as viewing the captured image displayed on the image capturing apparatus 900, the narration by the user 180 can more appropriately recorded.

Additionally, the image capturing apparatus 900 is switched to the image capturing mode when any operation for an image-capturing or a recording is performed by the user 180 in the case that its operation mode is set to the standby mode or the reproduction mode. The operation for an image-capturing includes such as capturing an image and adjusting some image capturing conditions such as a shutter speed and a focal distance. The operation for a recording includes such as recording a sound and adjusting any recording condition such as a recording sensitivity. Additionally, the image capturing apparatus 900 is switched to the reproduction mode when any operation for an reproducing of the image capturing apparatus 900 is performed by the user 180 in the case that its operation mode is set to the standby mode or the image capturing mode. The operation for a reproducing includes such as reproducing an image, selecting the image to be reproduced and adjusting any reproducing condition such as a reproduction speed. Additionally, the image capturing apparatus 900 may be switched to the standby mode when the image capturing apparatus 900 is set to the image capturing mode or the reproduction mode provided that the image capturing apparatus 900 is not operated by the user 180 during a predetermined period.

Figure 12:
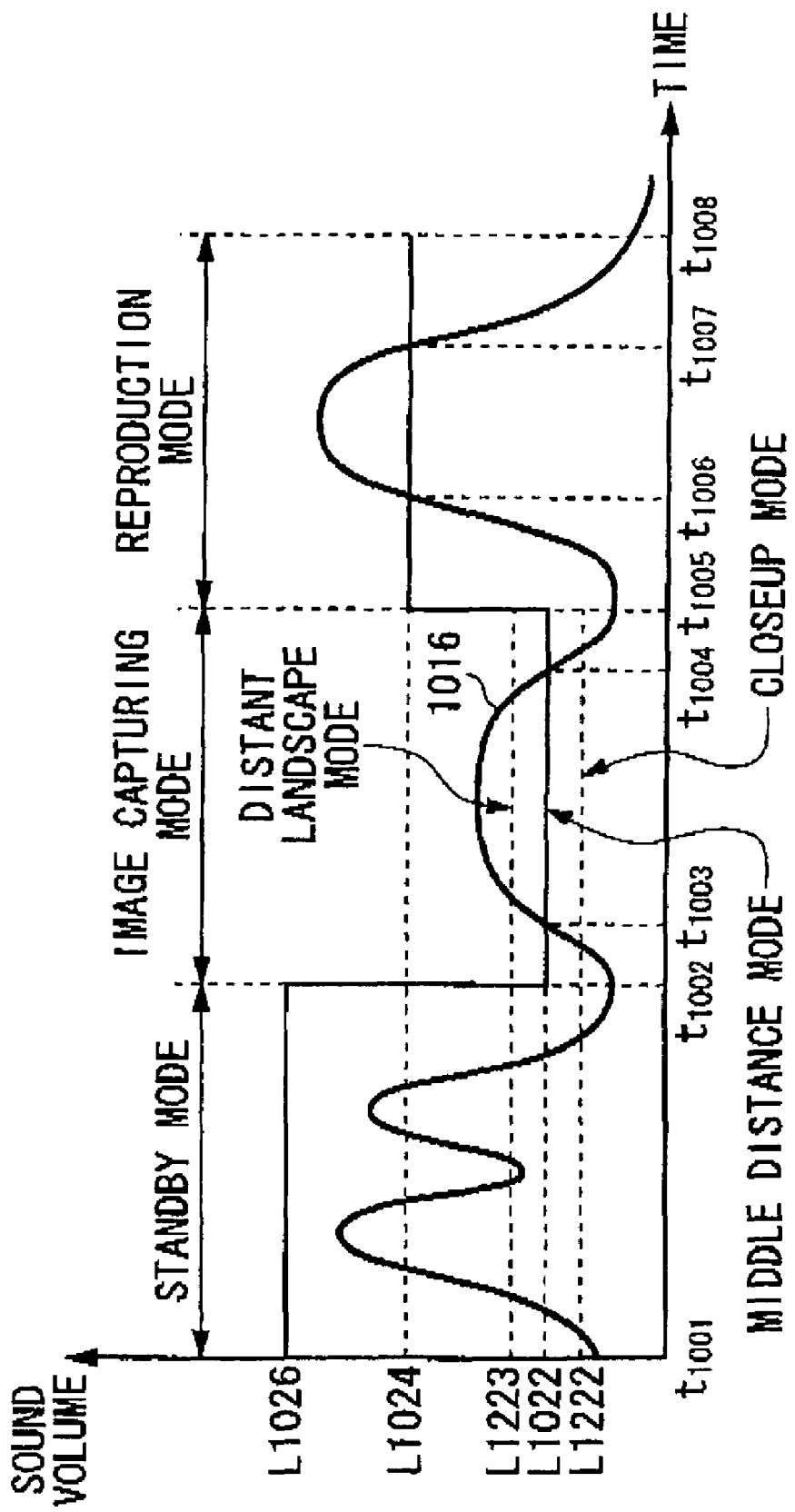
FIG. 12 shows an example of the variation with time of the threshold sound volume for each capturing mode.

FIG. 12 shows an example of the variation with time of the threshold sound volume for each capturing mode. The image capturing apparatus 900 has image capturing modes including an image capturing mode, a closeup mode, a middle distance mode and a distant landscape mode. For example, when the image capturing section 912 and the recording section 914 are set to the closeup mode within the time period (t1002-t1005), the threshold sound volume setting section 920 sets a threshold sound volume L1222 smaller than a threshold sound volume L1022 for the middle distance mode as shown in FIG. 12. At this time, the threshold sound volume setting section 920 may set the sound volume obtained by multiplying the threshold sound volume L1022 by a predetermined coefficient less than 1 as the threshold sound volume L1222.

Additionally, when the image capturing apparatus 912 and the recording section 914 are set to the distant landscape mode within the time period (t1002-t1005), the threshold sound volume setting section 920 sets a threshold sound volume L1223 larger than the threshold sound volume L1022 for the middle distance mode. At this time, the threshold sound volume setting section 920 may set the sound volume obtained by multiplying the threshold sound volume L1022 by a predetermined coefficient more than 1 as the threshold sound volume L1223. Here, the threshold sound volume setting section 920 may set the threshold sound volume L1223 smaller than the threshold sound volume L1024 and L1026. Additionally, the threshold sound volume setting section 920 may set the threshold sound volume depending on various image capturing modes such as a night scene mode and a daytime mode in addition to the image capturing modes including the closeup mode and the distance landscape mode, of course.

Additionally, the threshold sound volume setting section 920 may associate the threshold sound volume with the image capturing mode and store the same. In this case, the recording control section 922 may controls the recording section 914 to record the sound having the volume larger than the threshold sound volume associated with the image capturing mode of the image capturing section 912 and stored in the threshold sound volume setting section 920. As described above, the threshold sound volume setting section 920 can set the desirable threshold sound volume according to each of the image capturing modes. Therefore, the sound of a small insect can easily recorded by the recording section 914 when the user captures the image of the small insect in the closeup mode. Additionally, the surrounding noisy sound can not be easily recorded when the user captures the image of a landscape.

Figure 13:
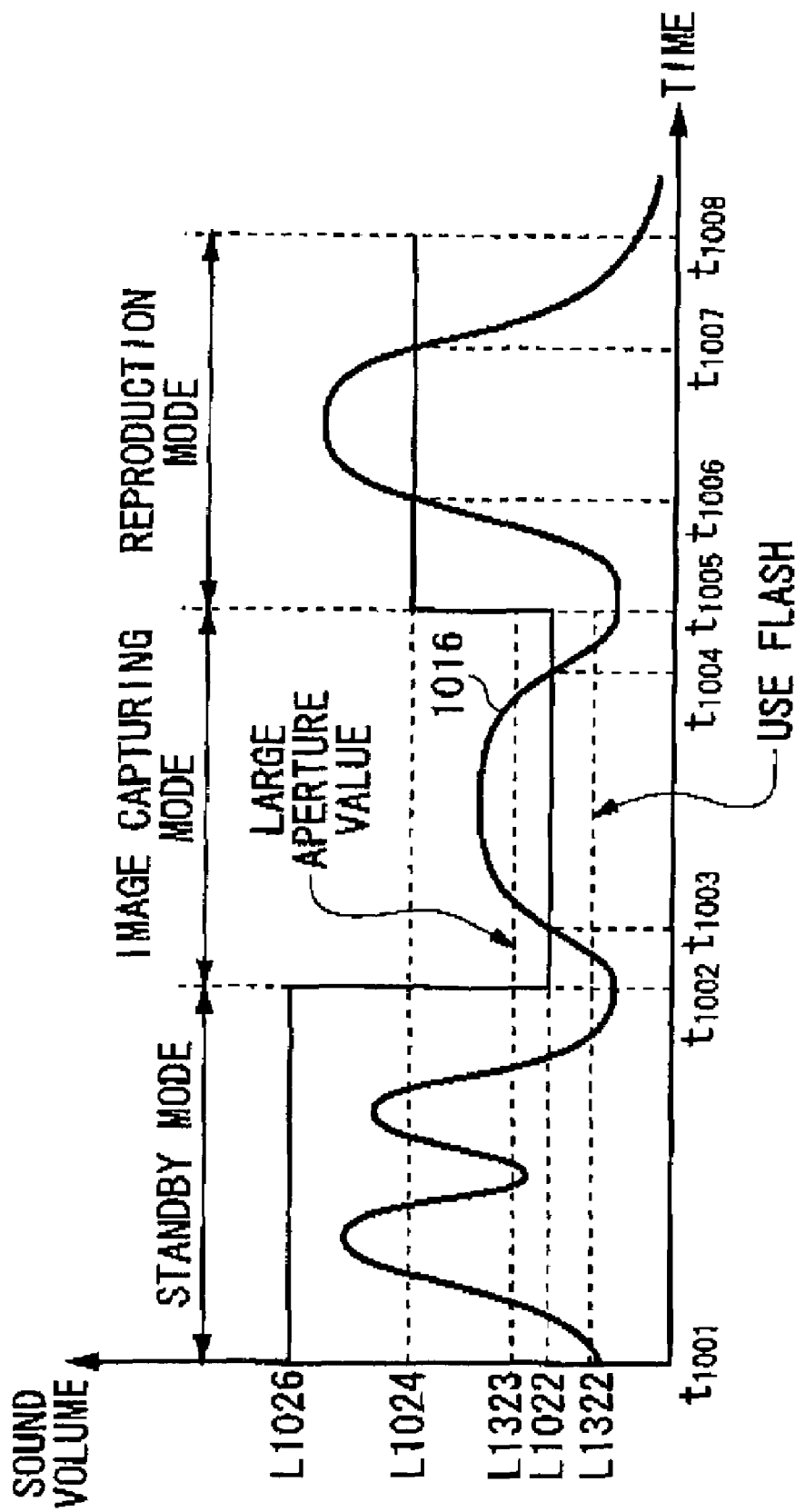
FIG. 13 shows an example of the variation with time of the threshold sound volume for each capturing condition.

FIG. 13 shows an example of the threshold sound volume set according to the capturing condition. For example, the threshold sound volume setting section 920 sets a threshold sound volume L1322 smaller than the threshold sound volume L1022 when the image capturing condition of the image capturing section 912 within the time period (t1002-t1005) is set to capture images using the flash as shown in FIG. 13. At this time, the threshold volume sound setting section 920 may set the sound volume obtained by multiplying the threshold sound volume L1022 by a predetermined coefficient less than 1 as the threshold sound volume L1322.

Additionally, the threshold sound volume setting section 920 sets a threshold sound volume L1323 larger than the threshold sound volume 1022 when the image capturing condition of the image capturing section 912 within the time period (t1002-t1005) is set to increase the aperture value. At this time, the threshold sound volume setting section 920 may set the sound volume obtained by multiplying the threshold sound volume L0122 by a predetermined coefficient more than 1 according to the aperture value as the threshold sound volume L1323. Here, the threshold sound volume setting section 920 may set the threshold sound volume 1323 smaller than the threshold sound volume L1024 and L1026. The threshold sound volume setting section 920 may set the threshold sound volume according to various image capturing conditions in addition to such as the flash and the aperture value, of course.

Additionally, the threshold sound volume setting section 920 may associate the threshold sound volume with the control value for the image capturing condition and store the same. In this case, the recording control section 922 may control the recording section 914 to record the sound having the volume larger than the threshold sound volume associated with the control value of the image capturing condition and stored in the threshold sound volume setting section 920. Additionally, the threshold sound volume setting section 920 may associate the coefficient by which the threshold sound volume L1022 is multiplied with the control value of the image capturing condition and store the same. As described above, the threshold sound volume setting section 920 can set the desirable threshold sound volume according to each of the image capturing conditions. For example, a night is generally quieter than a daytime. Additionally in many cases, images are captured using a flash at night, and in the day time, images are captured with the aperture value larger than at night. Accordingly, the threshold sound volume setting section 920 sets the threshold sound volume to be smaller at an image-capturing using the flash, so that the small sound surrounding the image capturing apparatus 900 can be easily recorded by the recording section 914 at a quiet night. Here, the threshold sound volume setting section 920 may set the threshold sound volume according to the image capturing time by the image capturing section 912. For example, when it is determined that the capturing image time is in the daytime, the threshold sound volume setting section 920 may set the threshold sound volume larger than that for the nighttime. Additionally, the threshold sound volume setting section 920 may determine the brightness surrounding the image capturing apparatus 900, and when the brightness surrounding the image capturing apparatus 900 is more than a predetermined brightness, the threshold sound volume setting section 920 may set larger threshold sound volume than the threshold sound volume for when the brightness surrounding the image capturing apparatus 900 is darker than the predetermined brightness.

Heretofore, it has been described that the sound to be recorded by the recording section 914 is determined by setting the threshold sound volume depending on the operation mode, the image capturing mode, the image capturing condition and the image capturing environment with reference to FIG. 11-FIG. 13. In addition to the determination by the threshold sound volume, the sensitivity of the sound collection section 980 is set depending on the operation mode, the image capturing mode, the image capturing condition and the image capturing environment, so that the sound to be recorded by the recording section can be determined. For example, the sensitivity of the sound collection section 980 is smaller when the threshold sound volume set to be larger, alternatively, the sensitivity of the sound collection section 980 is larger when the threshold sound volume set to be smaller in the description with reference to FIG. 11-FIG. 13. Thereby the sound depending on the operation mode, the image capturing mode, the image capturing condition and the image capturing environment can be recorded by the recording section 914.

Figure 14:
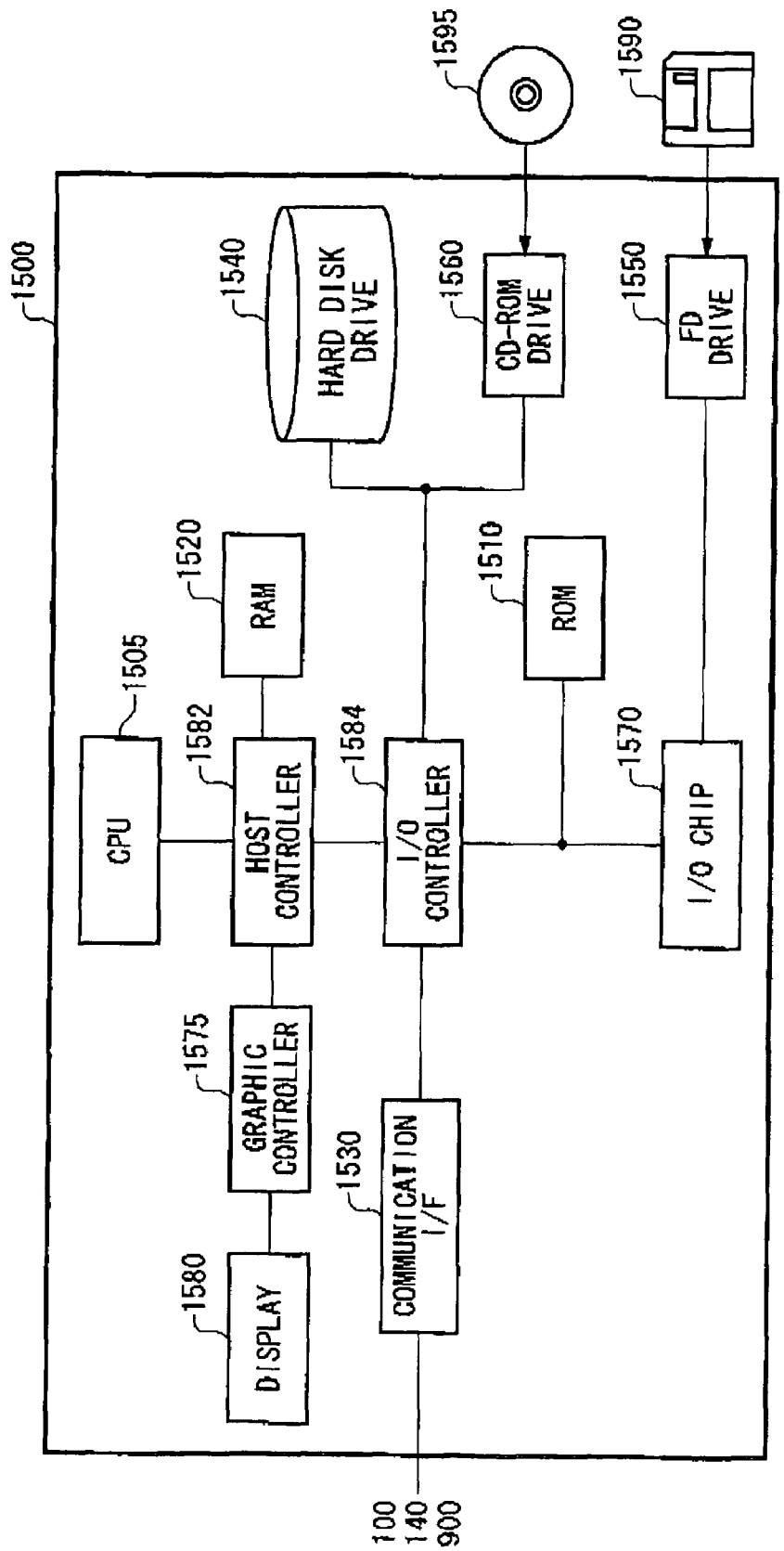
FIG. 14 shows an example of a hardware configuration of a computer 1500.

FIG. 14 shows an example of the hardware configuration of a computer 1500 involved in the image capturing apparatus 100 and the reproducing apparatus 140 according to the first embodiment and the image capturing apparatus 900 according to the second embodiment. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The hard disk drive 1540 stores the program and data used by the CPU 1505 of the computer 1500. The communication interface 1530 communicates with the apparatus 100, the reproducing apparatus 140 or the image capturing apparatus 900 through a network to provide the program or data to the image capturing apparatus 100, the reproducing apparatus 140 or the image capturing apparatus 900. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 and the communication interface 1530 through the RAM 1520. The input/output chip 1570 connects various input/output units through the flexible disk drive 1550 and such as a parallel port, a serial port, a keyboard port and a mouse port.

The program provided to the communication interface 1530 through the RAM 1620 is stored in a recording medium, such as the flexible disk 1590, the CD-ROM 1595, or an IC card and provided by the user. The program is read from the recording medium, provided to the communication interface 1530 through the RAM 1520 and transmitted to the image capturing apparatus 100, the reproducing apparatus 140 and the image capturing apparatus 900 through the network. Then each of the transmitted program is installed in the image capturing apparatus 100, reproducing apparatus 140 and the image capturing apparatus 900 and executed.

The program installed and executed in the image capturing apparatus 100 operates the image capturing apparatus 100 as described above with reference to FIG. 1, FIG. 2 and FIG. 4-FIG. 7. The program installed and executed in the reproduction apparatus 140 operates the reproduction apparatus 140 as described above with reference to FIG. 1, FIG. 3, FIG. 8 and FIG. 9. Additionally, the program installed and executed in the image capturing apparatus 900 operates the image capturing apparatus 900 as described above with reference to FIG. 10 and FIG. 13.

The above-described program may be stored in an external storage medium. The external recording medium may be an optical storage medium such as a DVD and a PD, a magnetooptical recording medium such as a MD, a tape medium and a semiconductor memory such as an IC card. A storage medium such as a hard disk or a RAM which is provided in the server system connected to a private communication network or Internet is used as the recording medium to provide the program to the user guiding apparatus 180 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image capturing apparatus comprising:
   an image capturing section for capturing a static image of a subject;
   a recording section for recording a sound surrounding the image capturing section;
   a threshold sound volume storage section for storing a specified threshold sound volume;
   a sound extraction section for extracting the sound within a part of period including the sound having the volume larger than the threshold sound volume stored in the threshold sound volume storage section among the sound recorded by the recording section;
   a data storage section for associating the image captured by the image capturing section with the sound extracted by the sound extraction section and storing the same;
   a data output section for synchronizing the captured image and the sound which are associated and stored in the data storage section and outputting the same;
   an environment identification section for identifying an environment surrounding the image capturing apparatus;
   a variable filter section for transmitting the sound within a specified frequency band; and
   a band control section for setting the frequency band of the sound transmitted through the variable filter section based on the environment identified by the environment identification section, wherein
   the recording section records the sound transmitted through the filter section.

2. The image capturing apparatus according to claim 1, wherein the data storage section associates each of a plurality of images captured by the image capturing section with each of a plurality of sounds extracted by the sound extraction section in the order of capturing and recording and stores the same.

3. The image capturing apparatus according claim 1 further comprising a threshold sound volume setting section for setting the threshold sound volume stored in the threshold sound volume storage section such that the total of the periods for the plurality of sounds extracted by the sound extraction section is equal to the period obtained by multiplying the number of the plurality of images captured by the image capturing section by a predetermined reproducing time of the captured image.

4. The image capturing apparatus according to claim 1 further comprising:
   a sound storage section for storing the sound recorded by the recording section; and
   a threshold sound volume setting section for setting the threshold sound volume stored in the threshold sound volume storage section based on the volume distribution of the sound stored in the sound volume storage section.

5. The image capturing apparatus according to claim 4, wherein the threshold sound volume setting section sets the threshold sound volume stored in the threshold sound volume storage section when the average of the volume of the sound stored in the sound storage section is larger.

6. The image capturing apparatus according to claim 1, wherein
   the threshold sound volume storage section associates the threshold sound volume for each band with a plurality of frequency bands and stores the same, and
   the sound extraction section compares the sound volume for each frequency band recorded by the recording section with the threshold sound volume for each band stored in the threshold sound volume storage section and extracts the sound within a part of period including the sound having the volume larger than the threshold sound volume for each band in a specific frequency band.

7. The image capturing apparatus according to claim 1 further comprising:
   a position detection section for detecting the position of the image capturing apparatus; and
   an environment information storage section for associating information indicative of the environment with information indicative of the position and storing the same, wherein
   the environment identification section retrieves the environment information storage section based on the position detected by the position detection section to identify the environment surrounding the image capturing apparatus.

8. The image capturing apparatus according to claim 1 further comprising:
   a time detection section for detecting a time; and
   an environment information storage section for associating information indicative of the environment with information indicative of the time and storing the same, wherein
   the environment identification section retrieves the environment information storage section based on the time detected by the time detection section.

9. An image capturing method comprising:
   capturing a static image of a subject using a image capturing section;
   recording a sound surrounding the image capturing section;
   storing a preset threshold sound volume;
   storing a specified threshold sound volume;
   extracting the sound within a part of period including the sound having the volume larger than the threshold sound volume stored in the storing of the threshold sound volume among the sound recorded in the recording;
   associating the image captured by the image capturing section with the sound extracted in the extracting of the sound, and the storing the same;
   synchronizing the captured image with the sound associated and stored in the previous storing and outputting the same;
   identifying an environment surrounding the image capturing apparatus transmitting the sound within a specified frequency band; and
   setting the frequency band of the sound transmitted through the variable filter section based on the environment identified by the environment identification section, wherein
   the sound transmitted through the filter section is recorded.

10. A recording medium containing a program for an image capturing apparatus for capturing a static image, the program operating the image capturing apparatus comprising:
- an image capturing section capturing a static image of a subject;
- a recording section recording a sound surrounding the image capturing section;
- a threshold sound volume storage section storing a specified threshold sound volume;
- a sound extraction section extracting the sound within a part of period including the sound having the volume larger than the thresh old sound volume stored in the threshold sound volume storage section among the sound recorded by the recording section;
- a data storage section associating the image captured by the image capturing section with the sound extracted by the sound extraction section;
- a data output section synchronizing the captured image with the sound which are associated and stored in the data storage section and outputting the same;
- an environment identification section for identifying an environment surrounding the image capturing apparatus;
- a variable filter section for transmitting the sound within a specified frequency band; and
- a band control section for setting the frequency band of the sound transmitted through the variable filter section based on the environment identified by the environment identification section, wherein
- the recording section records the sound transmitted through the filter section.

11. A reproduction apparatus comprising:
- a captured image storage section for storing a static image captured by an image capturing apparatus;
- a sound storage section for storing the sound recorded by the image capturing apparatus;
- a threshold sound volume storage section for storing the threshold sound volume;
- a sound volume extraction section for extracting the sound within a part of period including the sound having the volume larger than the threshold sound volume stored in the threshold sound volume storage section among the sound stored in the sound storage section;
- a data storage section for associating the captured image stored in the captured image storage section with the sound extracted by the sound extraction section and storing the same;
- a data output section for synchronizing the captured image with the sound which are associated and stored in the data storage section; and
- an allowed time storage section for storing a specified allowed time, wherein
- the captured image storage section associates a captured image with the time at which the image is captured by the image capturing apparatus and stores the same;
- the sound storage section associates a sound with the time at which the sound is recorded by the image capturing apparatus and stores the same, and
- the sound extraction section extracts the sound within a part of period including the sound having the volume larger than the threshold sound volume stored in the threshold sound volume storage section among the sound recorded at the times within the allowed time stored in the allowed time storage section before/after the time at which the captured image stored in the captured image storage section is captured.

12. The reproducing apparatus according to claim 11 further comprising:
- an instruction reception section for receiving an instruction on reproducing the captured image stored in the captured image storage section;
- a time detection section for detecting the time at which the instruction reception section receives the instruction; and
- an allowed time control section for setting the allowed time stored in the allowed time storage section to be longer in proportion to the magnitude of the difference between the time at which the captured image stored in the captured image storage section is captured and the time detected by the time detection section.

13. The reproducing apparatus according to claim 11 further comprising a threshold sound volume setting section for setting the threshold sound volume stored in the threshold sound volume storage section based on a volume distribution of the sound stored in the sound storage section.

14. The reproducing apparatus according to claim 13, wherein the threshold sound volume setting section sets the threshold sound volume stored in the threshold sound volume storage section to be larger when the average of the volume of the sound stored in the sound storage section is larger.

15. A reproducing method comprising:
- storing a static image captured by an image capturing apparatus;
- storing a sound recorded by the image capturing apparatus;
- storing a threshold sound volume;
- extracting the sound within a part of period including the sound having the volume larger than the threshold sound volume stored in the storing of the threshold sound volume among the sound stored in the sound storing;
- associating the captured image stored in the storing of the captured image with the sound extracted in the sound extracting, and storing the same;
- synchronizing the captured image with the sound which are associated and stored in the previous storing and outputting the same; and
- storing a specified allowed time, wherein
- a captured image is associated with the time at which the image is captured by the image capturing apparatus and stored;
- a sound is associated with the time at which the sound is recorded by the image capturing apparatus and stored, and
- the sound within a part of period including the sound having the volume larger than the threshold sound volume stored among the sound recorded at the times within the allowed time stored before/after the time at which the captured image is captured is extracted.

16. A recording medium containing a program for a reproducing apparatus for reproducing an image, the program operating the reproducing apparatus comprising:
- a captured image storage section storing a static image captured by an image capturing apparatus;
- a sound storage section storing a sound recorded by the image capturing apparatus;
- a threshold sound volume storage section storing a threshold sound volume;
- a sound extraction section extracting the sound within a part of period including the sound having the volume larger than the threshold sound volume stored in the threshold sound volume storage section among the sound stored in the sound storage section;

a data storage section associating the captured image stored in the captured image storage section with the sound extracted by the sound extraction section and storing the same;

a data output section synchronizing the captured image with the sound which are associated and stored in the data storage section and outputting the same; and an allowed time storage section for storing a specified allowed time, wherein the captured image storage section associates a captured image with the time at which the image is captured by the image capturing apparatus and stores the same;

the sound storage section associates a sound with the time at which the sound is recorded by the image capturing apparatus and stores the same, and the sound extraction section extracts the sound within a part of period including the sound having the volume larger than the threshold sound volume stored in the threshold sound volume storage section among the sound recorded at the times within the allowed time stored in the allowed time storage section before/after the time at which the captured image stored in the captured image storage section is captured.

* * * * *